(12) United States Patent
Utsunomiya et al.

(10) Patent No.: US 11,951,675 B2
(45) Date of Patent: Apr. 9, 2024

(54) THREE-DIMENSIONAL OBJECT PRINTING METHOD AND ROBOT TEACHING METHOD

(71) Applicant: SEIKO EPSON CORPORATION, Tokyo (JP)

(72) Inventors: Kohei Utsunomiya, Matsumoto (JP); Masayuki Okuyama, Suwa (JP); Yuki Ishii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/821,382

(22) Filed: Aug. 22, 2022

(65) Prior Publication Data

US 2023/0064877 A1 Mar. 2, 2023

(30) Foreign Application Priority Data

Aug. 25, 2021 (JP) .................. 2021-137196

(51) Int. Cl.
| | |
|---|---|
| *B29C 64/112* | (2017.01) |
| *B05B 13/04* | (2006.01) |
| *B05D 1/26* | (2006.01) |
| *B29C 64/209* | (2017.01) |
| *B29C 64/232* | (2017.01) |
| *B29C 64/236* | (2017.01) |
| *B29C 64/393* | (2017.01) |
| *B33Y 10/00* | (2015.01) |
| *B33Y 50/02* | (2015.01) |
| *B25J 9/16* | (2006.01) |

(52) U.S. Cl.
CPC ........ *B29C 64/112* (2017.08); *B05B 13/0431* (2013.01); *B05D 1/26* (2013.01); *B29C 64/209* (2017.08); *B29C 64/232* (2017.08); *B29C 64/236* (2017.08); *B29C 64/393* (2017.08); *B33Y 10/00* (2014.12); *B33Y 50/02* (2014.12); *B25J 9/163* (2013.01); *B25J 9/1664* (2013.01)

(58) Field of Classification Search
None
See application file for complete search history.

(56) References Cited

U.S. PATENT DOCUMENTS

| | | |
|---|---|---|
| 2015/0042716 A1 | 2/2015 | Beier et al. |
| 2018/0250889 A1* | 9/2018 | Czinger ................. B22F 10/18 |

FOREIGN PATENT DOCUMENTS

JP 2015-520011 A 7/2015

\* cited by examiner

*Primary Examiner* — Michael P. Rodriguez
(74) *Attorney, Agent, or Firm* — WORKMAN NYDEGGER

(57) ABSTRACT

A surface of a workpiece has a smooth region, and a stepped region including a step. A three-dimensional object printing method includes first print operation of ejecting liquid from a head onto the smooth region, and second print operation, antecedent to or subsequent to the first print operation, of ejecting liquid from the head onto the stepped region. The amount of change in an angle of ejection, which is angle formed by a first normal line and a second normal line, during execution of the second print operation is larger than the amount of change in the angle of ejection during execution of the first print operation. The first normal line is a line normal to the ejection face. The second normal line is a line normal to the surface of the workpiece at a point of intersection with the first normal line.

4 Claims, 9 Drawing Sheets

THREE-DIMENSIONAL OBJECT PRINTING METHOD AND ROBOT TEACHING METHOD

The present application is based on, and claims priority from JP Application Serial Number 2021-137196, filed Aug. 25, 2021, the disclosure of which is hereby incorporated by reference herein in its entirety.

BACKGROUND

1. Technical Field

The present disclosure relates to a three-dimensional object printing method and a robot teaching method.

2. Related Art

A three-dimensional object printing method of performing printing on a surface of a three-dimensional workpiece using a robot by employing an ink-jet technique is known. For example, a system disclosed in JP-T-2015-520011 includes a robot and a print head mounted on the robot and ejects ink droplets from the print head toward a curved surface of an object.

JP-T-2015-520011 discloses a method that includes a step of measuring a region on the surface of the object three-dimensionally, a step of generating a set of spatial points corresponding to the region, a step of generating a three-dimensional network corresponding to the region, and a step of generating a three-dimensional path for moving a robot.

There is no disclosure in JP-T-2015-520011 about a specific method for the step of generating the three-dimensional path. In order to perform printing with high quality on a surface of a workpiece using a robot, a solution for realizing suitable operation of the robot in accordance with the shape of the workpiece is awaited.

SUMMARY

A certain aspect of the present disclosure is a three-dimensional object printing method using a head and a robot, the head having an ejection face in which a plurality of nozzles for ejecting liquid is provided, the robot changing relative position and orientation of the head in relation to a three-dimensional workpiece, a surface of the workpiece having a smooth region and a stepped region, the stepped region being adjacent to the smooth region and including a step, the three-dimensional object printing method comprising: first print operation of ejecting liquid from the head onto the smooth region during a period of changing the relative position and orientation of the head and the workpiece; and second print operation, antecedent to or subsequent to the first print operation, of ejecting liquid from the head onto the stepped region during a period of changing the relative position and orientation of the head and the workpiece, wherein an amount of change in an angle of ejection during execution of the second print operation is larger than an amount of change in the angle of ejection during execution of the first print operation, where, the angle of ejection is an angle formed by a first normal line and a second normal line, the first normal line is a line normal to the ejection face, and the second normal line is a line normal to the surface of the workpiece at a point of intersection with the first normal line.

Another aspect of the present disclosure is a robot teaching method for teaching a robot configured to, based on print path information, change relative position and orientation of a head in relation to a three-dimensional workpiece, the head being configured to ejecting liquid, a surface of the workpiece having a smooth region and a stepped region, the stepped region being adjacent to the smooth region and including a step, the robot teaching method comprising: a first step of acquiring three-dimensional data, which is data representing a shape of the workpiece using a plurality of polygons; a second step of designating, among the plurality of polygons, a plurality of passing polygons, which are polygons corresponding to a region to be scanned by the head; a third step of setting position and orientation indicated by a plurality of smooth teaching points, which are teaching points over the smooth region, based on a plurality of smooth passing polygons, which are polygons corresponding to the smooth region, among the plurality of passing polygons; a fourth step of setting either one or both of position and orientation indicated by a plurality of stepped teaching points, which are teaching points over the stepped region, based on the plurality of smooth passing polygons or the plurality of smooth teaching points; and a fifth step of generating the print path information, based on the plurality of smooth teaching points and the plurality of stepped teaching points.

DESCRIPTION OF EXEMPLARY EMBODIMENTS

Figure 1:
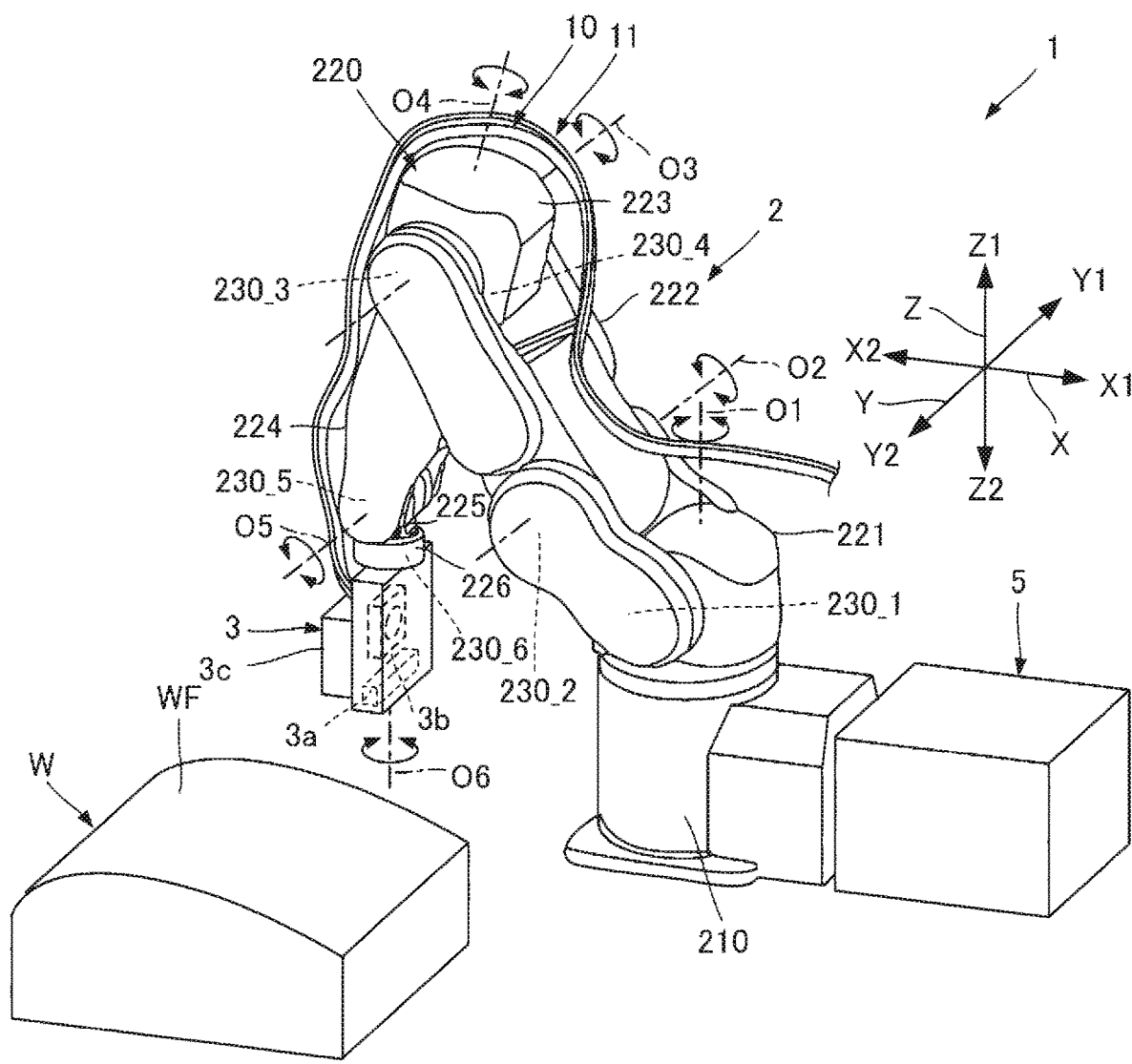
FIG. 1 is a perspective view for providing an overview of a three-dimensional object printing apparatus used in a three-dimensional object printing method according to a first embodiment.

With reference to the accompanying drawings, some preferred embodiments of the present disclosure will now be described. The dimensions and scales of components illustrated in the drawings may be different from actual dimensions and scales, and some components may be schematically illustrated for easier understanding. The scope of the present disclosure shall not be construed to be limited to the specific embodiments described below unless and except where the description contains an explicit mention of an intent to limit the present disclosure.

To facilitate the readers' understanding, the description below will be given with reference to X, Y, and Z axes intersecting with one another. In the description below, one direction along the X axis will be referred to as the X1 direction, and the direction that is the opposite of the X1 direction will be referred to as the X2 direction. Similarly, directions that are the opposite of each other along the Y axis will be referred to as the Y1 direction and the Y2 direction. Directions that are the opposite of each other along the Z axis will be referred to as the Z1 direction and the Z2 direction.

The X, Y, and Z axes correspond to coordinate axes of a world coordinate system set in a space in which a robot 2 to be described later is installed. Typically, the Z axis is a vertical axis, and the Z2 direction corresponds to a vertically-downward direction. A base coordinate system based on the position of a pedestal portion 210, which will be described later, of the robot 2 is associated with the world coordinate system by calibration. In the description below, for the purpose of explanation, a case where the operation of the robot 2 is controlled using the world coordinate system as a robot coordinate system will be taken as an example.

The Z axis does not necessarily have to be a vertical axis. The X, Y, and Z axes are typically orthogonal to one another, but are not limited thereto; they could be mutually non-orthogonal axes. For example, it is sufficient as long as the X, Y, and Z axes intersect with one another within an angular range of 80° or greater and 100° or less.

1. First Embodiment

1-1. Overview of Three-Dimensional Object Printing Apparatus

FIG. 1 is a perspective view for providing an overview of a three-dimensional object printing apparatus 1 used in a three-dimensional object printing method according to a first embodiment. The three-dimensional object printing apparatus 1 is an apparatus that performs ink-jet printing on a surface of a three-dimensional workpiece W.

The workpiece W has a print target face WF, on which printing is to be performed. In the example illustrated in FIG. 1, the face WF is a curved convex surface having a plurality of portions with different curvatures. Though not illustrated in FIG. 1, as will be described in detail later, the face WF has a region having a difference in level. The workpiece W during the process of printing is supported by a predetermined structural supporter such as, for example, a workpiece placement table, a robot hand, or a conveyor as may be necessary. The print target face may be any of the plurality of faces of the workpiece W other than the face WF, instead of the face WF. The size, shape, placement orientation, etc. of the workpiece W is not limited to the example illustrated in FIG. 1. The workpiece W may have any size, shape, placement orientation, etc.

As illustrated in FIG. 1, the three-dimensional object printing apparatus 1 includes the robot 2, a head unit 3, a controller 5, a tubing portion 10, and a wiring portion 11. First, these components will now be explained briefly in a sequential manner.

The robot 2 is a machine that changes the position and orientation of the head unit 3 in the world coordinate system. In the example illustrated in FIG. 1, the robot 2 is a so-called six-axis vertical articulated robot.

As illustrated in FIG. 1, the robot 2 includes a pedestal portion 210 and an arm portion 220.

The pedestal portion 210 is a base column that supports the arm portion 220. In the example illustrated in FIG. 1, the pedestal portion 210 is fastened with screws, etc. to an installation plane such as a floor or a table, etc. facing in the Z1 direction. The installation plane to which the pedestal portion 210 is fixed may be oriented in any direction. For example, the pedestal portion 210 may be installed on a wall, on a ceiling, on the surface of a wheeled platform, or the like, without any limitation to the example illustrated in FIG. 1.

The arm portion 220 is a six-axis robot arm module that has a base end mounted on the pedestal portion 210 and a distal end whose position and orientation are configured to change three-dimensionally in relation to the base end. Specifically, the arm portion 220 includes arms 221, 222, 223, 224, 225, and 226, which are called also as links. They are coupled to one another sequentially in this order.

The arm 221 is coupled to the pedestal portion 210 via a joint 230_1 in such a way as to be able to rotate around a rotation axis O1. The arm 222 is coupled to the arm 221 via a joint 230_2 in such a way as to be able to rotate around a rotation axis O2. The arm 223 is coupled to the arm 222 via a joint 230_3 in such a way as to be able to rotate around a rotation axis O3. The arm 224 is coupled to the arm 223 via a joint 230_4 in such a way as to be able to rotate around a rotation axis O4. The arm 225 is coupled to the arm 224 via a joint 230_5 in such a way as to be able to rotate around a rotation axis O5. The arm 226 is coupled to the arm 225 via a joint 230_6 in such a way as to be able to rotate around a rotation axis O6.

Each of the joints 230_1 to 230_6 is a mechanism that couples, among the pedestal portion 210 and the arms 221 to 226, one of two that are kinetically adjacent to each other to the other in a rotatable manner. In the description below, each of the joints 230_1 to 230_6 may be referred to as "joint 230".

On each of the joints 230_1 to 230_6, a driving mechanism that causes one of corresponding two mutually-adjacent members to rotate in relation to the other is provided, though not illustrated in FIG. 1. The driving mechanism includes, for example, a motor that generates a driving force for the rotation, a speed reducer that performs speed reduction on the driving force and outputs the reduced force, and an encoder such as a rotary encoder that detects the amount of operation such as the angle of the rotation. A collective set of the driving mechanisms provided respectively on the joints 230_1 to 230_6 corresponds to an arm driving mechanism 2a, which will be described later with reference to FIG. 2.

The rotation axis O1 is an axis that is perpendicular to the non-illustrated installation plane to which the pedestal portion 210 is fixed. The rotation axis O2 is an axis that is perpendicular to the rotation axis O1. The rotation axis O3 is an axis that is parallel to the rotation axis O2. The rotation axis O4 is an axis that is perpendicular to the rotation axis O3. The rotation axis O5 is an axis that is perpendicular to the rotation axis O4. The rotation axis O6 is an axis that is perpendicular to the rotation axis O5.

With regard to these rotation axes, the meaning of the word "perpendicular" is not limited to a case where the angle formed by two rotation axes is exactly 90°. In addition to such exact perpendicularity, the meaning of the word "perpendicular" encompasses cases where the angle formed by two rotation axes is within a range of approximately ±5° from 90°. Similarly, the meaning of the word "parallel" is not limited to a case where two rotation axes are exactly parallel to each other, but also encompasses cases where one of the two rotation axes is inclined with respect to the other within a range of approximately ±5°.

On the arm 226, which is the most distal one of the arms of the arm portion 220 of the robot 2, the head unit 3 is mounted as an end effector and is fastened with screws, etc.

The head unit 3 is an assembly that has a head 3a configured to eject ink, which is an example of "liquid", toward the workpiece W. In the present embodiment, besides the head 3a, the head unit 3 includes a pressure adjustment valve 3b and an energy emitter 3c. The head unit 3 will be described in detail later with reference to FIG. 3.

The ink is not limited to any specific kind of ink. Examples of the ink include water-based ink in which a colorant such as dye or pigment is dissolved in a water-based dissolvent, curable ink using curable resin such as ultraviolet curing resin, solvent-based ink in which a colorant such as dye or pigment is dissolved in an organic solvent. Among them, curable ink can be used as a preferred example. The type of the curable ink is not specifically limited. For example, any of thermosetting ink, photo-curable ink, radiation-curable ink, electron-beam-curable ink, and the like, may be used. A preferred example is photo-curable ink such as ultraviolet curing ink. The ink is not limited to a solution and may be formed by dispersion of a colorant or the like as a dispersoid in a dispersion medium. The ink is not limited to colorant-containing ink. For example, the ink may contain, as a dispersoid, conductive particles such as metal particles for forming wiring lines, etc. Alternatively, the ink may be clear ink, or process liquid for surface treatment of the workpiece W.

The tubing portion 10 and the wiring portion 11 are connected to the head unit 3. The tubing portion 10 is a tube through which ink is supplied from a non-illustrated ink tank to the head unit 3, or a group of such tubes. The wiring portion 11 is a wire through which an electric signal for driving the head 3a is supplied, or a group of such wires.

Figure 2:
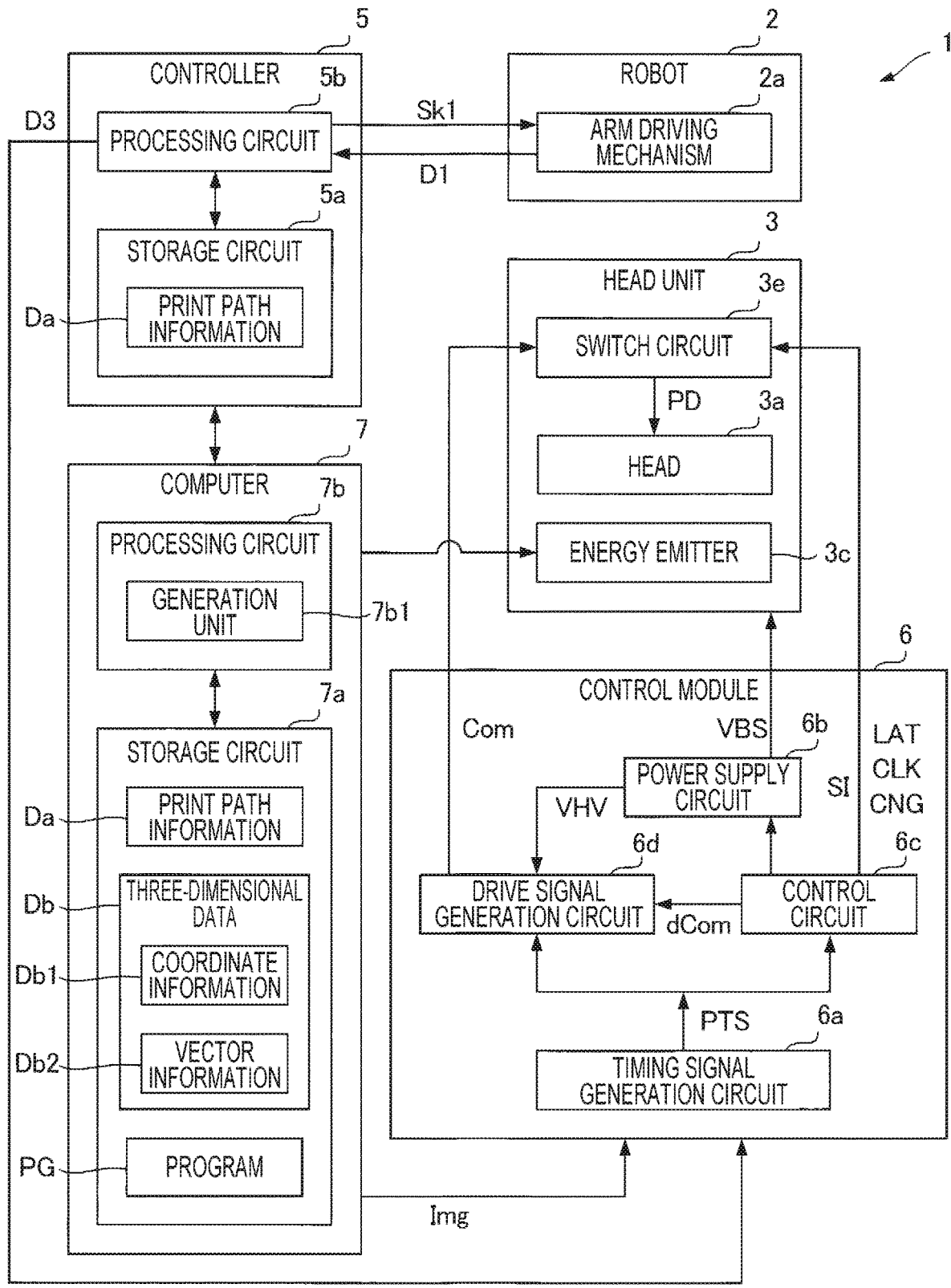
FIG. 2 is a block diagram that illustrates the electric configuration of the three-dimensional object printing apparatus used in the three-dimensional object printing method according to the first embodiment.

The controller 5 is a robot controller that controls the driving of the robot 2. With reference to FIG. 2, the electric configuration of the three-dimensional object printing apparatus 1 will be described below, including a detailed explanation of the controller 5.

1-2. Electric Configuration of Three-Dimensional Object Printing Apparatus

FIG. 2 is a block diagram that illustrates the electric configuration of the three-dimensional object printing apparatus 1 used in the three-dimensional object printing method according to the first embodiment. In FIG. 2, among the components of the three-dimensional object printing apparatus 1, electric components are illustrated. As illustrated in FIG. 2, besides the components described above with reference to FIG. 1, the three-dimensional object printing apparatus 1 includes a control module 6 communicably connected to the controller 5, and a computer 7 communicably connected to the controller 5 and the control module 6.

Any of electric components illustrated in FIG. 2 may be split into two or more subcomponents as needed. A part of one electric component illustrated in FIG. 2 may be included in another one. One electric component illustrated in FIG. 2 may be integrated with another one. For example, a part or a whole of the functions of the controller 5 or the control module 6 may be embodied by the computer 7, or by an external device such as a personal computer (PC) connected to the controller 5 via a network such as a local area network (LAN) or the Internet.

The controller 5 has a function of controlling the driving of the robot 2 and a function of generating a signal D3 for synchronizing the ejection of ink by the head unit 3 with the operation of the robot 2.

The controller 5 includes a storage circuit 5a and a processing circuit 5b.

The storage circuit 5a stores various programs that are to be run by the processing circuit 5b and various kinds of data that are to be processed by the processing circuit 5b. The storage circuit 5a includes, for example, a semiconductor memory that is either one of a volatile memory such as, for example, a random-access memory (RAM), and a nonvolatile memory such as, for example, a read-only memory (ROM), an electrically erasable programmable read-only memory (EEPROM), or a programmable ROM (PROM), or includes semiconductor memories constituted by both of them. A part or a whole of the storage circuit 5a may be included in the processing circuit 5b.

Print path information Da is stored in the storage circuit 5a. The print path information Da is information that is used for controlling the operation of the robot 2 and indicates the position and orientation of the head 3a on a path along which the head 3a is to move. The print path information Da is expressed using, for example, coordinate values of the base coordinate system or the world coordinate system. In a method for teaching the robot 2 that will be described later, based on three-dimensional data Db representing the shape of the workpiece W, the print path information Da is generated by the computer 7. The print path information Da is inputted from the computer 7 into the storage circuit 5a. The print path information Da may be expressed using coordinate values of a workpiece coordinate system. In this case, the print path information Da is used for controlling the operation of the robot 2 after having been converted into coordinate values of the base coordinate system or the world coordinate system from the coordinate values of the workpiece coordinate system.

Based on the print path information Da, the processing circuit 5b controls the operation of the arm driving mechanism 2a of the robot 2 and generates the signal D3. The processing circuit 5b includes one or more processors such as, for example, central processing unit (CPU). Instead of the CPU or in addition to the CPU, the processing circuit 5b may include a programmable logic device such as, for example, field-programmable gate array (FPGA).

The arm driving mechanism 2a is a collective set of the driving mechanisms provided respectively on the joints 230_1 to 230_6 described earlier. For each of the joints 230, the arm driving mechanism 2a includes a motor for driving this joint of the robot 2 and an encoder for detecting the rotation angle of this joint of the robot 2.

The processing circuit 5b performs inverse kinematics calculation that is a computation for converting the print path information Da into the amount of operation such as the angle of rotation and the speed of rotation, etc. of each of the joints 230 of the robot 2. Then, based on an output D1 from each of the encoders of the arm driving mechanism 2a, the processing circuit 5b outputs a control signal Sk1 such that the actual amount of operation such as the actual angle of rotation and the actual speed of rotation, etc. of each of the joints 230 will be equal to the result of the computation that is based on the print path information Da. The control signal Sk1 is a signal for controlling the driving of the motor of the arm driving mechanism 2a. Based on an output from a non-illustrated distance sensor, the control signal Sk1 is corrected by the processing circuit 5b as may be necessary.

Based on the output D1 from at least one of the plurality of encoders of the arm driving mechanism 2a, the processing circuit 5b generates the signal D3. For example, the processing circuit 5b generates, as the signal D3, a trigger signal that includes a pulse of timing at which the value of the output D1 from at least one of the plurality of encoders becomes a predetermined value.

The control module 6 is a circuit that controls, based on the signal D3 outputted from the controller 5 and print data Img outputted from the computer 7, the ink-ejecting operation of the head unit 3. The control module 6 includes a timing signal generation circuit 6a, a power supply circuit 6b, a control circuit 6c, and a drive signal generation circuit 6d.

Based on the signal D3, the timing signal generation circuit 6a generates a timing signal PTS. The timing signal generation circuit 6a is, for example, a timer configured to start the generation of the timing signal PTS when triggered by the detection of the signal D3.

The power supply circuit 6b receives power supply from a commercial power source that is not illustrated, and generates various predetermined potentials. The various potentials generated by the power supply circuit 6b are supplied to components of the control module 6 and the head unit 3. For example, the power supply circuit 6b generates a power potential VHV and an offset potential VBS. The offset potential VBS is supplied to the head unit 3. The power potential VHV is supplied to the drive signal generation circuit 6d.

Based on the timing signal PTS, the control circuit 6c generates a control signal SI, a waveform specifying signal dCom, a latch signal LAT, a clock signal CLK, and a change signal CNG. These signals are in synchronization with the timing signal PTS. Among these signals, the waveform specifying signal dCom is inputted into the drive signal generation circuit 6d. The rest of them are inputted into a switch circuit 3e of the head unit 3.

The control signal SI is a digital signal for specifying the operation state of the drive element of the head 3a of the head unit 3. Specifically, the control signal SI is a signal that specifies whether to supply a drive signal Com, which will be described later, to the drive element or not, based on the print data Img. For example, the control signal SI specifies whether to eject ink from the nozzle corresponding to this drive element or not and specifies the amount of ink ejected from this nozzle. The waveform specifying signal dCom is a digital signal for specifying the waveform of the drive signal Com. The latch signal LAT and the change signal CNG are signals that are used together with the control signal SI and specify the timing of ejection of ink from the nozzle by specifying the drive timing of the drive element. The clock signal CLK serves as a reference clock that is in synchronization with the timing signal PTS.

The control circuit 6c described above includes one or more processors such as, for example, CPUs. Instead of the CPU or in addition to the CPU, the control circuit 6c may include a programmable logic device, for example, an FPGA.

The drive signal generation circuit 6d is a circuit that generates the drive signal Com for driving each drive element of the head 3a of the head unit 3. Specifically, the drive signal generation circuit 6d includes, for example, a DA conversion circuit and an amplification circuit. In the drive signal generation circuit 6d, the DA conversion circuit converts the format of the waveform specifying signal dCom supplied from the control circuit 6c from a digital signal into an analog signal, and the amplification circuit amplifies the analog signal by using the power potential VHV supplied from the power supply circuit 6b, thereby generating the drive signal Com. A signal having a waveform that is supplied actually to the drive element, as a part of the waveform included in the drive signal Com, serves as a drive pulse PD. The drive pulse PD is supplied from the drive signal generation circuit 6d to the drive element via the switch circuit 3e of the head unit 3.

The switch circuit 3e is a circuit that includes a switching element configured to, based on the control signal SI, switch whether or not to supply at least a part of the waveform included in the drive signal Com as the drive pulse PD.

The computer 7 is a desktop-type or notebook-type computer in which programs such as a program PG are installed. The computer 7 has a function of generating the print path information Da, a function of supplying information such as the print path information Da to the controller 5, and a function of supplying information such as the print data Img to the control module 6. In addition to these functions, the computer 7 according to the present embodiment has a function of controlling the driving of the energy emitter 3c.

The computer 7 includes a storage circuit 7a and a processing circuit 7b. In addition to them, the computer 7 includes an input device such as a keyboard, a mouse, etc. for receiving operations from a user, though not illustrated. The computer 7 may include a display device such as a liquid crystal panel that displays information needed for generating the print path information Da.

The storage circuit 7a stores various programs that are to be run by the processing circuit 7b and various kinds of data that are to be processed by the processing circuit 7b. The storage circuit 7a includes, for example, a semiconductor memory that is either one of a volatile memory such as a RAM, and a nonvolatile memory such as a ROM, an EEPROM, or a PROM, or includes semiconductor memories constituted by both of them. A part or a whole of the storage circuit 7a may be included in the processing circuit 7b.

The print path information Da, the three-dimensional data Db, and the program PG are stored in the storage circuit 7a. The program PG is a program for generating the print path information Da, based on the three-dimensional data Db. The three-dimensional data Db is data in an STL (Standard Triangulated Language) format, etc. representing the shape of the workpiece W using a plurality of polygons. The three-dimensional data Db includes coordinate information Db1, which is information regarding the coordinate of each polygonal vertex, and vector information Db2, which is information regarding each normal vector representing the front or the back of the polygon's face. The three-dimensional data Db is obtained by converting computer-aided design (CAD) data that represents the three-dimensional shape of the workpiece W when needed. The three-dimensional data Db may be expressed using coordinate values of the workpiece coordinate system or coordinate values of the base coordinate system or the world coordinate system.

The processing circuit 7b implements each function described above by running programs such as the program PG. The processing circuit 7b includes one or more processors such as, for example, CPUs. Instead of the CPU or in addition to the CPU, the processing circuit 7b may include a programmable logic device, for example, an FPGA.

The processing circuit 7b behaves as a generation unit 7b1 by running the program PG. Based on the three-dimensional data Db, the generation unit 7b1 generates the print path information Da. The generation of the print path information Da by the generation unit 7b1 will be described in detail later with reference to FIGS. 5 to 15.

1-3. Structure of Head Unit

Figure 3:
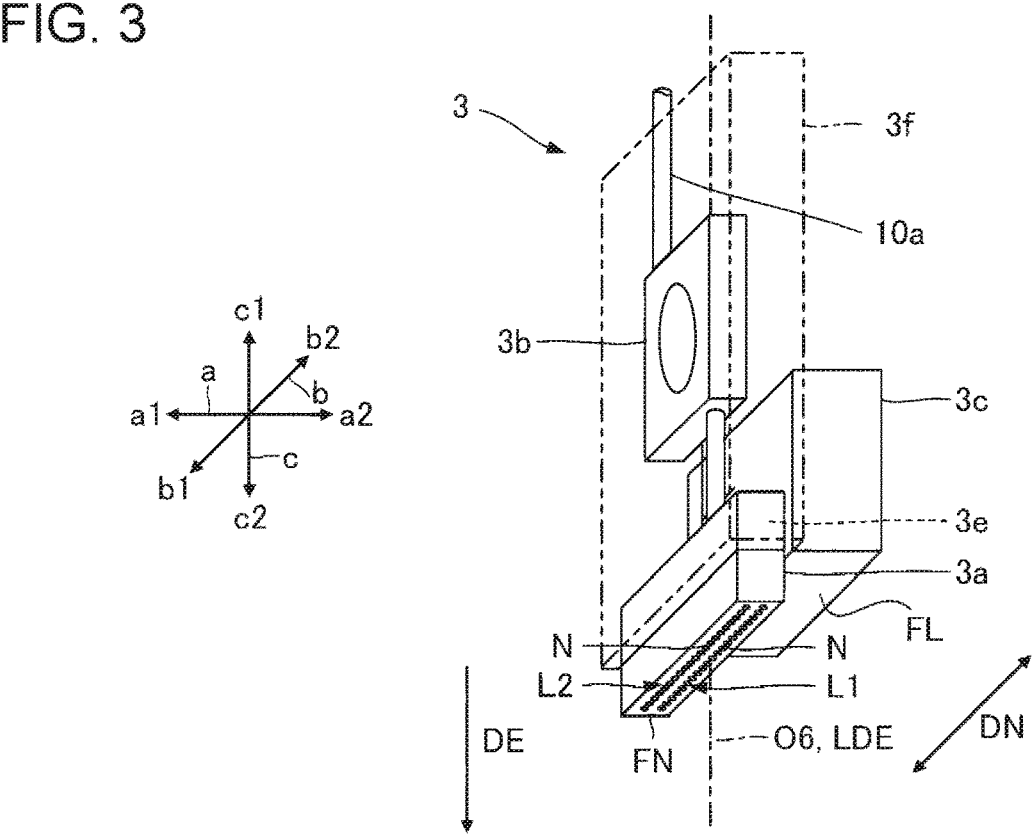
FIG. 3 is a perspective view of a schematic structure of a head unit.

FIG. 3 is a perspective view of a schematic structure of the head unit 3. To facilitate the readers' understanding, the description below will be given with reference to a, b, and c axes intersecting with one another. In the description below, one direction along the a axis will be referred to as the a1 direction, and the direction that is the opposite of the a1 direction will be referred to as the a2 direction. Similarly, directions that are the opposite of each other along the b axis will be referred to as the b1 direction and the b2 direction. Directions that are the opposite of each other along the c axis will be referred to as the c1 direction and the c2 direction.

The a, b, and c axes correspond to coordinate axes of a tool coordinate system set for the head unit 3. The position and orientation in the tool coordinate system relative to the world coordinate system or the robot coordinate system described earlier change due to the operation of the robot 2 described earlier. In the example illustrated in FIG. 3, the c axis is parallel to the rotation axis O6 described earlier. The a, b, and c axes are typically orthogonal to one another, but are not limited thereto. For example, it is sufficient as long as the a, b, and c axes intersect with one another within an angular range of 80° or greater and 100° or less. The tool coordinate system is associated with the base coordinate system or the robot coordinate system by calibration.

The tool coordinate system is set based on a tool center point TCP. Therefore, the position and orientation of the head 3a is specified based on the tool center point TCP. For example, the tool center point TCP may be located at the center of an ejection face FN. Alternatively, the tool center point TCP may be located in a space away from the head 3a in an ejection direction DE, in which ink is ejected.

As described earlier, the head unit 3 includes the head 3a, the pressure adjustment valve 3b, and the energy emitter 3c. These components are supported by a support member 3f indicated by alternate-long-and-two-short-dashes illustration in FIG. 3. In the example illustrated in FIG. 3, the head unit 3 has a single head 3a and a single pressure adjustment valve 3b. However, the number of each of them is not limited to one. The head unit 3 may have two or more heads 3a and/or two or more pressure adjustment valves 3b. The position where the pressure adjustment valve 3b is provided is not limited to the arm 22b. For example, the pressure adjustment valve 3b may be provided on any other arm, etc. The pressure adjustment valve 3b may be provided at a fixed position with respect to the pedestal portion 210.

The support member 3f is made of, for example, a metal material, and is substantially rigid. In FIG. 3, the support member 3f has a low-profile box-like shape. However, the support member 3f may have any shape, without being limited to the illustrated example.

The support member 3f described above is mounted on the arm 22b described earlier. Therefore, the head 3a, the pressure adjustment valve 3b, and the energy emitter 3c are supported together by the support member 3f onto the arm 22b. For this reason, the relative position of each of the head 3a, the pressure adjustment valve 3b, and the energy emitter 3c in relation to the arm 22b is fixed. In the example illustrated in FIG. 3, the pressure adjustment valve 3b is located at a relatively c1-side position with respect to the head 3a. The energy emitter 3c is located at a relatively a2-side position with respect to the head 3a.

The head 3a has the ejection face FN and a plurality of nozzles N formed in the ejection face FN. The ejection face FN is a nozzle face in which the nozzles N are formed. For example, the ejection face FN is a surface of nozzle plate having the nozzles N provided as through-hole orifices in a plate-like member made of silicon (Si) or metal, etc. In the example illustrated in FIG. 3, the direction of a first normal line LDE, which is a line normal to the ejection face FN, namely, the ejection direction DE, in which ink is ejected from the nozzles N, is the c2 direction, and the plurality of nozzles N can be grouped into a nozzle row L1 and a nozzle row L2, which are arranged next to each other, with an interval in the direction along the a axis therebetween. Each of the nozzle row L1 and the nozzle row L2 is a group of nozzles N arranged linearly in the direction along the b axis. The head 3a has a structure in which elements related to the respective nozzles N of the nozzle row L1 and elements related to the respective nozzles N of the nozzle row L2 are substantially symmetric to each other in the direction along the a axis. An array direction DN, which will be described later, is parallel to the b axis.

The positions of the nozzles N belonging to the nozzle row L1 and the positions of the nozzles N belonging to the nozzle row L2 may be the same as one another, or different from one another, in the direction along the b axis. Elements related to the respective nozzles N of either the nozzle row L1 or the nozzle row L2 may be omitted. In the example described below, the positions of the nozzles N belonging to the nozzle row L1 and the positions of the nozzles N belonging to the nozzle row L2 are the same as one another in the direction along the b axis.

Though not illustrated, for each of the nozzles N individually, the head 3a has a piezoelectric element, which is a drive element, and a cavity, in which ink can be contained. Each of the plurality of piezoelectric elements is configured to change the internal pressure of the cavity corresponding to the piezoelectric element, and, as a result of this pressure change, ink is ejected from the nozzle corresponding to this cavity in the ejection direction DE. The head 3a described above can be manufactured by, for example, preparing a plurality of substrates such as silicon substrates processed using etching or the like and then bonding the substrates together by means of an adhesive or the like. Instead of the piezoelectric element, a heater that heats ink inside the cavity may be used as a drive element for ejecting ink from the nozzle.

Ink is supplied to the head 3a described above from a non-illustrated ink tank through a supply tube 10a of the tubing portion 10. The pressure adjustment valve 3b is provided between the supply tube 10a and the head 3a.

The pressure adjustment valve 3b is a valve mechanism that opens and closes in accordance with the pressure of ink inside the head 3a. The opening and closing of this valve mechanism keeps the pressure of ink inside the head 3a within a predetermined negative pressure range even when a positional relationship between the head 3a and the non-illustrated ink tank mentioned above changes. Keeping such negative ink pressure stabilizes ink meniscus formed in each nozzle N of the head 3a. Stable meniscus prevents external air from entering the nozzles N in the form of air bubbles and prevents ink from spilling out of the nozzles N. Ink flowing from the pressure adjustment valve 3b is distributed to a plurality of passages in the head 3a through non-illustrated branch passages. The ink supplied from the non-illustrated ink tank is sent into the supply tube 10a by a pump or the like at predetermined pressure.

The energy emitter 3c emits energy such as light, heat, an electron beam, or a radiation beam, etc. for curing or solidifying ink on the workpiece W. For example, when the ink has ultraviolet-curing property, the energy emitter 3c includes light emitting elements, etc. configured to emit ultraviolet light such as ultraviolet light emitting diodes (LEDs). The energy emitter 3c may include optical components such as lenses for adjusting the direction in which the energy is emitted, the range of energy emission, or the like as needed.

The energy emitter 3c does not necessarily have to cure, or solidify, the ink on the workpiece W completely. In this case, it is sufficient as long as the ink after the energy irradiation from the energy emitter 3c is cured or solidified completely by means of, for example, energy emitted from a curing light source installed separately on the installation plane on which the pedestal portion 210 of the robot 2 is installed.

1-4. Print Operation of Robot

Figure 4:
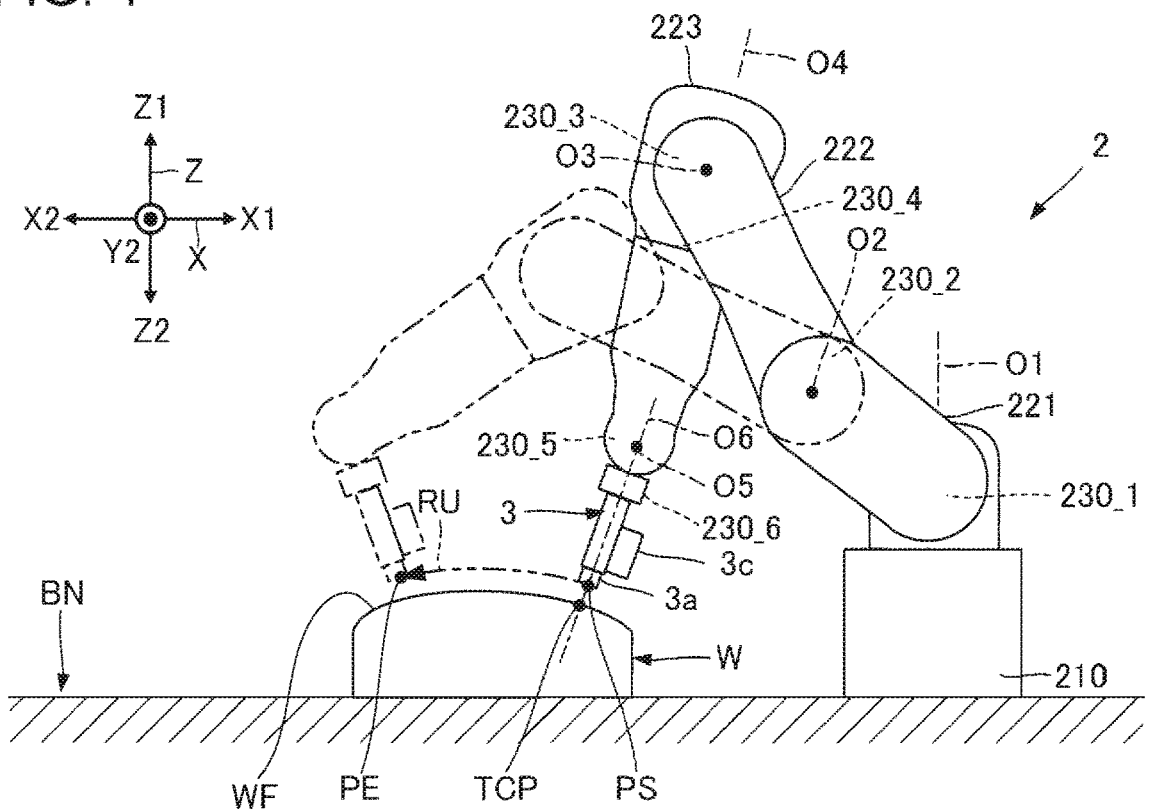
FIG. 4 is a diagram for explaining an example of print operation of a robot.

FIG. 4 is a diagram for explaining an example of print operation of the robot 2. In the example illustrated in FIG. 4, printing is performed on the face WF of the workpiece W placed at a relatively X2-side position with respect to the robot 2.

In print operation, the head 3a ejects ink while the robot 2 changes the position and orientation of the head 3a. The position and orientation of the head 3a is changed based on the print path information Da. By this means, the head 3a moves along a movement path RU while keeping predetermined relative orientation in relation to the face WF. The movement path RU is a path from a position PS to a position PE.

In the example illustrated in FIG. 4, the movement path RU is a curved path extending non-linearly in the X-axis direction as viewed in the Z2 direction. In the present embodiment, the robot 2 performs print operation by causing three of the six joints 230 to rotate. More specifically, while print operation is performed, the robot 2 causes the joints 230_2, 230_3, and 230_5 to rotate in a state in which the rotation axis of each of them is parallel to the Y axis. Operating these three joints 230 in this way makes it possible to move the head 3a along the movement path RU stably. The robot 2 may perform print operation by causing four or more of the six joints 230 to rotate. In this case, the position where the workpiece W is placed and the orientation in which the workpiece W is placed is not limited to the example illustrated in FIG. 4. The workpiece W may be placed at any position in any orientation.

Figure 5:
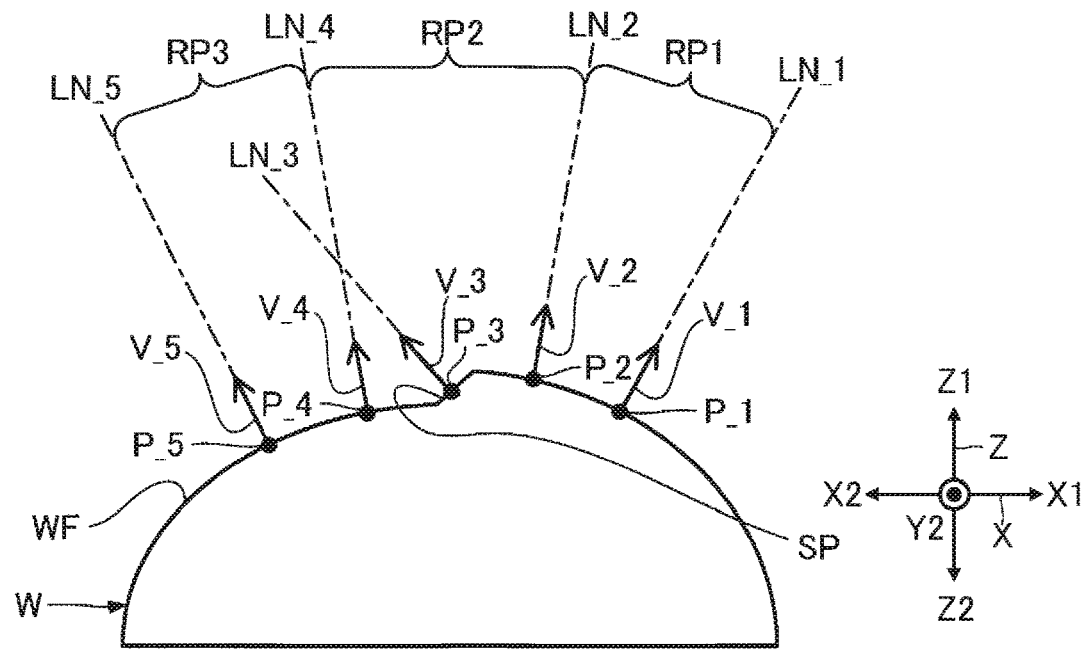
FIG. 5 is a diagram for explaining smooth regions and a stepped region of a workpiece.

FIG. 5 is a diagram for explaining smooth regions RP1 and RP3 and a stepped region RP2 of the workpiece W. Though not illustrated in FIG. 4, the face WF of the workpiece W has the smooth regions RP1 and RP3 and the stepped region RP2 as illustrated in FIG. 5. These regions, in the order of the smooth region RP1, the stepped region RP2, and the smooth region RP3, are arranged in the direction of relative movement of the head 3a during print operation in relation to the workpiece W.

In the example illustrated in FIG. 5, there are positions P_1 to P_5 located in this order toward the X2-directional side. The region from the position P_1 to the position P_2 is the smooth region RP1. The region from the position P_2 to the position P_4 is the stepped region RP2. The region from the position P_4 to the position P_5 is the smooth region RP3.

Each of the smooth regions RP1 and RP3 has a smooth surface having substantially no difference in level. A "substantially smooth surface" is, for example, a surface not having a difference in level of 300 μm or greater. In other words, a surface having fine differences in level of less than 300 μm can be regarded as a substantially smooth surface. The stepped region RP2 is a region adjacent to the smooth regions RP1 and RP3 and having a predetermined width including a step SP.

The step SP is constituted of two surfaces different in level, a level-difference surface continuous from one of these two surfaces to the other, and two corners, one of which lies between the one of these two surfaces and the level-difference surface, and the other of which lies between the level-difference surface and the other of these two surfaces. In the example illustrated in FIG. 5, the position P_3 is on the level-difference surface. The slope angle of the level-difference surface inclined with respect to each of these two surfaces is not less than 40°. The width of the level-difference surface in a direction from the one of these two surfaces to the other via the level-difference surface is not more than twice of the width of the ejection face FN in the direction along the a axis. The predetermined width is not less than twice and not more than five times of the width of the ejection face FN in the direction along the a axis. The step according to the present disclosure is not limited to this example. The level-difference surface of the step SP may be a curved convex surface or a curved concave surface. One of the two corners of the step SP, or both, may be rounded. The step SP may be a concave portion having a locally-recessed cross-sectional shape such as a V shape or a U shape, etc., or a convex portion that is an inversion thereof. That is, the step SP may have a shape like a groove or a shape like a bump.

It can be said that the stepped region RP2 includes a portion having a greater curvature than the smooth regions RP1 and RP3. This is because, for example, when the above-mentioned two corners located in the stepped region RP2 are observed microscopically, the curvature of the corner in cross section is greater than the curvature of the surface of the smooth region RP1, RP3 in cross section. More particularly, the reason is, when each portion in cross section is approximated to a circle, the stepped region RP2, especially the corners thereof, is expressed using a circle having a smaller radius in comparison with the smooth region RP1, RP3, and the smooth region RP1, RP3 is expressed using a circle having a larger radius in comparison with the stepped region RP2.

In FIG. 5, normal lines LN_1 to LN_5 and normal vectors V_1 to V_5 are illustrated respectively for the positions P_1 to P_5. In the description below, each of the positions P_1 to P_5 may be referred to as "position P". Similarly, each of the normal lines LN_1 to LN_5 may be referred to as "second normal line LN". Each of the normal vectors V_1 to V_5 may be referred to as "normal vector V".

Figure 6:
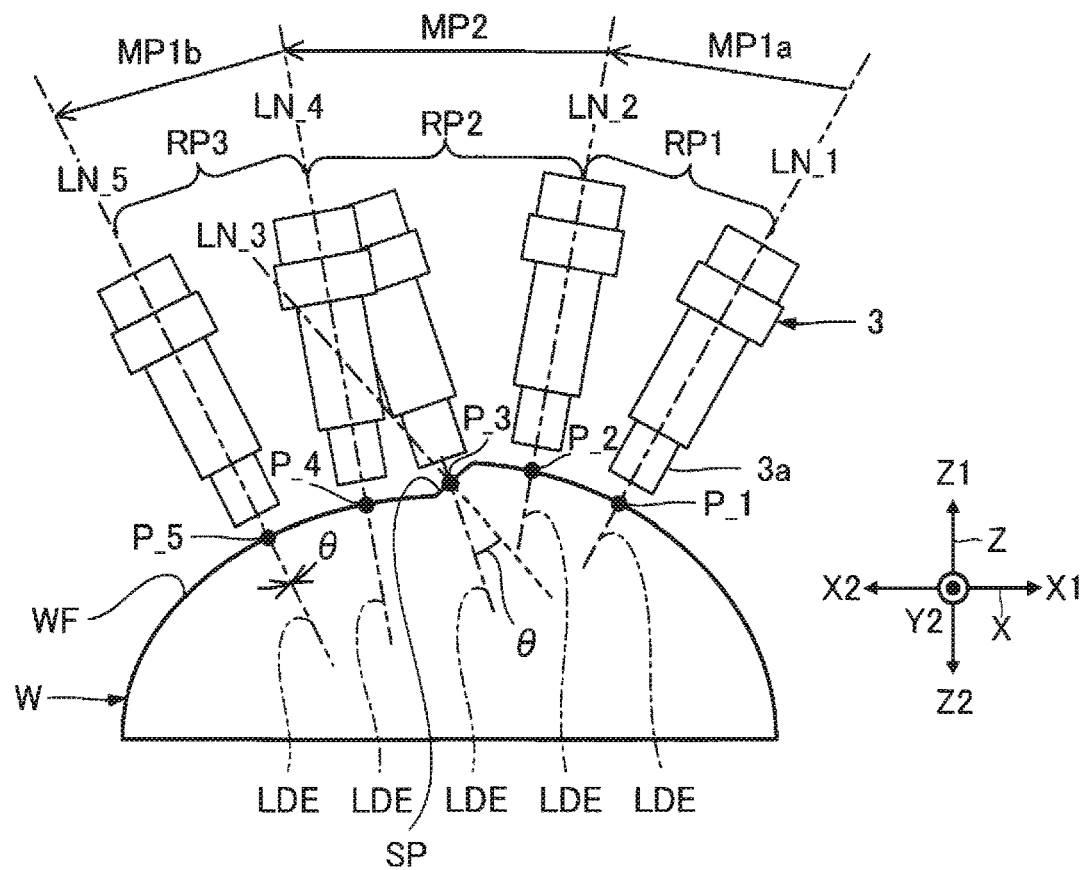
FIG. 6 is a diagram for explaining the three-dimensional object printing method according to the first embodiment.

FIG. 6 is a diagram for explaining the three-dimensional object printing method according to the first embodiment. In FIG. 6, the position and orientation of the head unit 3 corresponding to each position P_1 to P_5 during print operation is illustrated. The three-dimensional object printing method includes a first print operation MP1a, a second print operation MP2, and another first print operation MP1b.

In the first print operation MP1a, printing is performed on the smooth region RP1 of the workpiece W. In the second print operation MP2, printing is performed on the stepped region RP2 of the workpiece W. In the first print operation MP1b, printing is performed on the smooth region RP3 of the workpiece W.

In the present embodiment, the first print operation MP1a, the second print operation MP2, and the first print operation MP1b are performed in this order in the same printing pass. Therefore, the second print operation MP2 is subsequent to the first print operation MP1a in the same printing pass as that of the first print operation MP1a, MP1b. The second print operation MP2 is antecedent to the first print operation MP1b in the same printing pass as that of the first print operation MP1a, MP1b. Though a case where the first print operation MP1a, the second print operation MP2, and the first print operation MP1b are performed in the same printing pass is described as an example in the present embodiment, these operations do not necessarily have to be performed successively in the same printing pass. For example, the second print operation MP2 may be performed after performing the first print operations MP1a and MP1b successively. However, performing the first print operations and the second print operation in the same printing pass could be advantageous in terms of higher productivity. When the first printing operation MP1 and the second printing operation MP2 are executed in the same printing path, these printing operations are smoothly connected. Therefore, it may be difficult to distinguish between the first printing operation MP1 and the second printing operation MP2 only by the movement path RU.

In the first print operation MP1a, ink is ejected from the head 3a onto the smooth region RP1 during a period of changing the relative position and orientation of the head 3a and the workpiece W. Similarly, in the first print operation MP1b, ink is ejected from the head 3a onto the smooth region RP3 during a period of changing the relative position and orientation of the head 3a and the workpiece W.

In order to obtain higher image quality, it is preferable if the amount of change in the angle of ejection θ during the execution of the first print operation MP1a, MP1b is as small as possible. The angle of ejection θ is an angle formed by the first normal line LDE, which is a line normal to the ejection face FN, and the second normal line LN, which is a line normal to the surface of the workpiece W at the point of intersection with the first normal line LDE. That is, it can be said that the head 3a is being scanned in a comparatively faithful manner in relation to the shape of the surface of the workpiece W when the amount of change in the angle of ejection θ is small. Conversely, it can be said that the head 3a is being scanned less faithfully in relation to the shape of the surface of the workpiece W when the amount of change in the angle of ejection θ is large. Therefore, it can be said that the head 3a is being scanned in a comparatively faithful manner in relation to the shape of the surface of the workpiece W during the execution of the first print operation MP1a, MPb.

In the second print operation MP2, ink is ejected from the head 3a onto the stepped region RP2 during a period of changing the relative position and orientation of the head 3a and the workpiece W.

The amount of change in the angle of ejection θ during the execution of the second print operation MP2 is larger than the amount of change in the angle of ejection θ during the execution of the first print operation MP1a, MP1b. Therefore, it is possible to suppress a sharp change in the orientation of the head 3a caused by the operation of the robot 2 performed between the first print operations MP1a and MP1b. Since the head 3a is not scanned so faithfully during the execution of the second print operation MP2 in relation to the shape of the surface of the workpiece W in comparison with the first print operation MP1a, MP1b, it is possible to prevent the collision of the head 3a with the workpiece W. Moreover, it is possible to improve image quality as a whole by reducing the vibrations of the robot 2.

Figure 7:
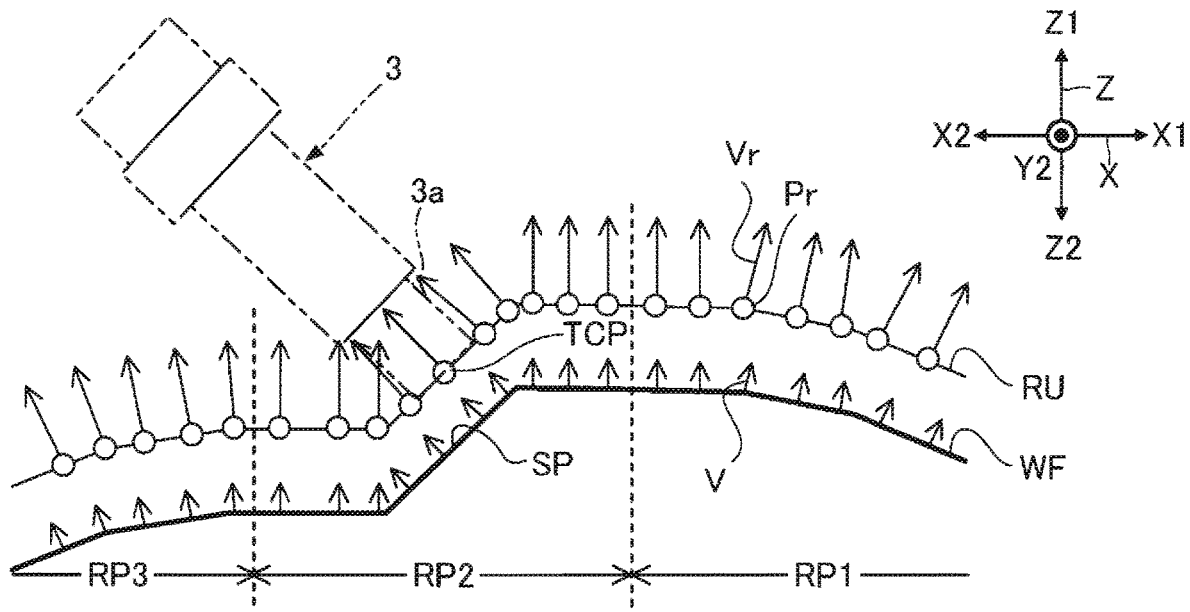
FIG. 7 is a diagram for explaining a movement path of a head according to a referential example.

FIG. 7 is a diagram for explaining the movement path RU of the head 3a according to a referential example. In this referential example, the tool center point TCP is set to be on the center of the ejection face FN, and the print path information Da is set such that the movement path RU is drawn in a space apart from the face WF. FIG. 7 illustrates a vector Vr that indicates the orientation of the head 3a at each position Pr on the movement path RU for a case where the angle of ejection θ is constant. That is, in FIG. 7, the orientation of the head 3a substantially agrees with the normal vector V of the workpiece W throughout the entire area including the smooth region RP1, the stepped region RP2, and the smooth region RP3. For this reason, the head 3a is scanned in a comparatively faithful manner in relation to the shape of the surface of the workpiece W in every region. In this case, a sharp change in the orientation of the head 3a occurs during the execution of the second print operation MP2. Such a sharp change in the orientation of the head 3a could result in the collision of the head 3a with the workpiece W. Moreover, since such a sharp change in the orientation of the head 3a causes vibrations of the robot 2, image quality might decrease.

Figure 8:
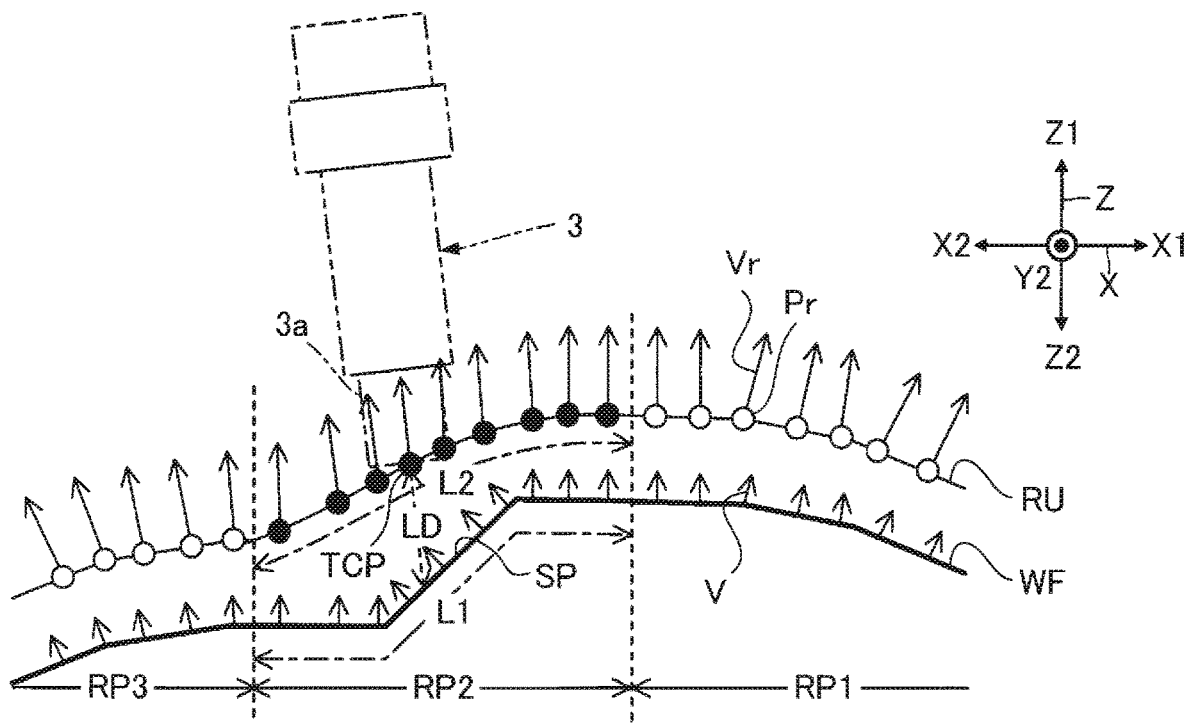
FIG. 8 is a diagram for explaining a movement path of a head according to the first embodiment.

FIG. 8 is a diagram for explaining the movement path RU of the head 3a according to the first embodiment. In the present embodiment, the tool center point TCP is set to be on the center of the ejection face FN, and the print path information Da is set such that the movement path RU is drawn in a space apart from the face WF. FIG. 8 illustrates a vector Vr that indicates the orientation of the head 3a at each position Pr on the movement path RU for a case where the amount of change in the angle of ejection θ during the execution of the second print operation MP2 is larger than the amount of change in the angle of ejection θ during the execution of the first print operation MP1a, MP1b. As compared with the case illustrated in FIG. 7, each of the position Pr and the vector Vr during the execution of the second print operation MP2 changes more smoothly in this case. That is, a sharp change in the orientation of the head 3a is less prone to occur in this case.

As described above, the amount of change in the angle of ejection θ during the execution of the second print operation MP2 is larger than the amount of change in the angle of ejection θ during the execution of the first print operation MP1a, MP1b. In addition, the amount of change in the distance of ejection LD during the execution of the second print operation MP2 is larger than the amount of change in the distance of ejection LD during the execution of the first print operation MP1a, MP1b. The distance of ejection LD is the distance between the ejection face FN and the workpiece W in the direction along the first normal line LDE.

The length L2 of the trajectory of the head 3a during the execution of the second print operation MP2 is less than the length of the stepped region RP2 along the trajectory, that is, less than the length L1 of the region where printing is performed on the surface of the workpiece W during the execution of the second print operation MP2.

In order to reduce the vibrations of the robot 2, it is preferable if the relative moving speed of the ejection face FN in relation to the surface of the workpiece W is as constant as possible. On the other hand, however, in order to obtain higher image quality at the stepped region RP2 while keeping the time taken for printing short, it is preferable if the relative moving speed of the ejection face FN in relation to the surface of the workpiece W during the execution of the second print operation MP2 is not higher than the relative moving speed of the ejection face FN in relation to the surface of the workpiece W during the execution of the first print operation MP1a, MP1b.

1-5. Robot Teaching Method

Figure 9:
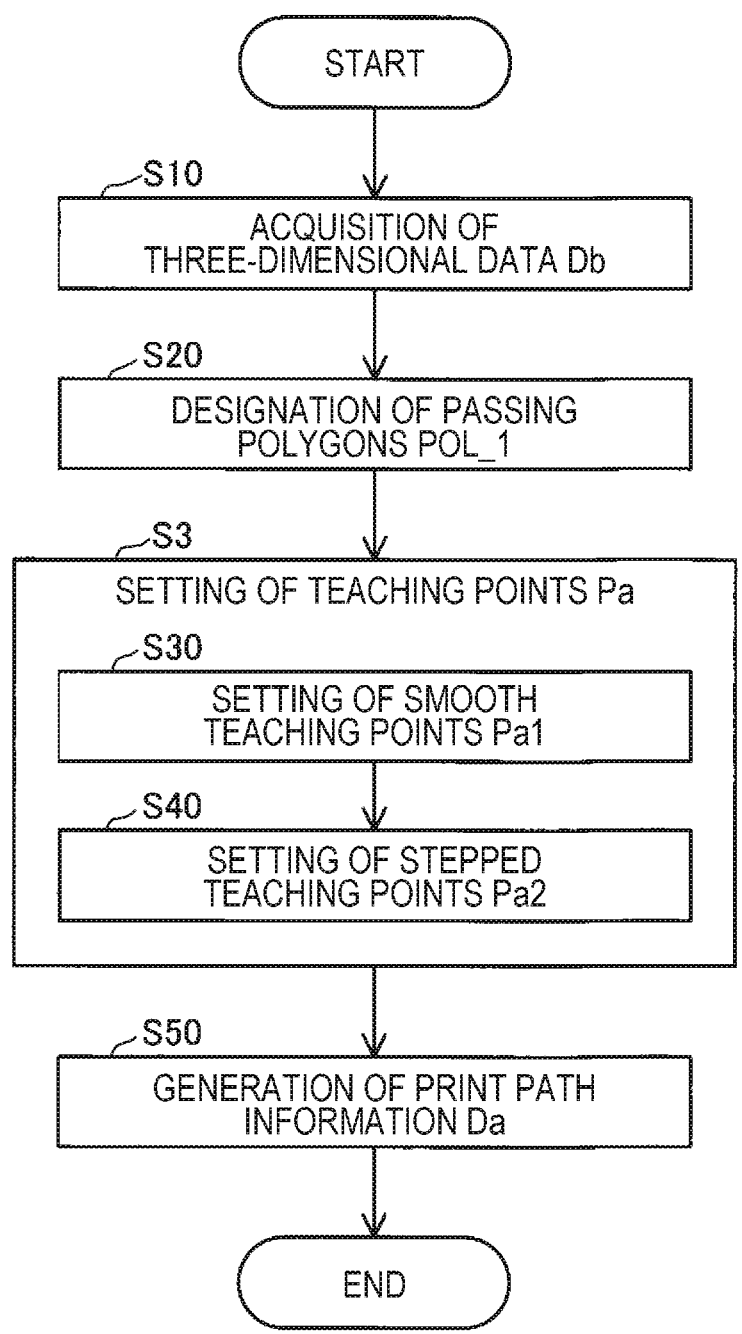
FIG. 9 is a flowchart that illustrates a method for teaching the robot according to the first embodiment.

FIG. 9 is a flowchart that illustrates a method for teaching the robot 2 according to the first embodiment. The teaching method will now be described, taking an example of a case where the three-dimensional object printing apparatus 1 described above is used. The teaching method is implemented using the computer 7. The computer 7, more specifically, the generation unit 7b1, generates the print path information Da by implementing the teaching method.

As illustrated in FIG. 9, the teaching method includes a first step S10, a second step S20, a third step S30, a fourth step S40, and a fifth step S50. These steps are executed in this order.

In the first step S10, the three-dimensional data Db is acquired. In the second step S20, a plurality of passing polygons POL_1 is identified from among a plurality of polygons POL represented by the three-dimensional data Db. In the third step S30, a plurality of smooth teaching points Pa1 is set using the plurality of passing polygons POL_1. In the fourth step S40, a plurality of stepped teaching points Pa2 is set using a plurality of smooth passing polygons POL_1a or using the plurality of smooth teaching points Pa1. In the fifth step S50, the print path information Da is generated based on the plurality of smooth teaching points Pa1 and the plurality of stepped teaching points Pa2. In a step S3 comprising the step S30 and the step S40, the plurality of smooth teaching points Pa1 and the plurality of stepped teaching points Pa2 are set as a plurality of teaching points Pa over the face WF of the workpiece W. Each of the steps mentioned above will now be explained in detail in sequence.

Figure 10:
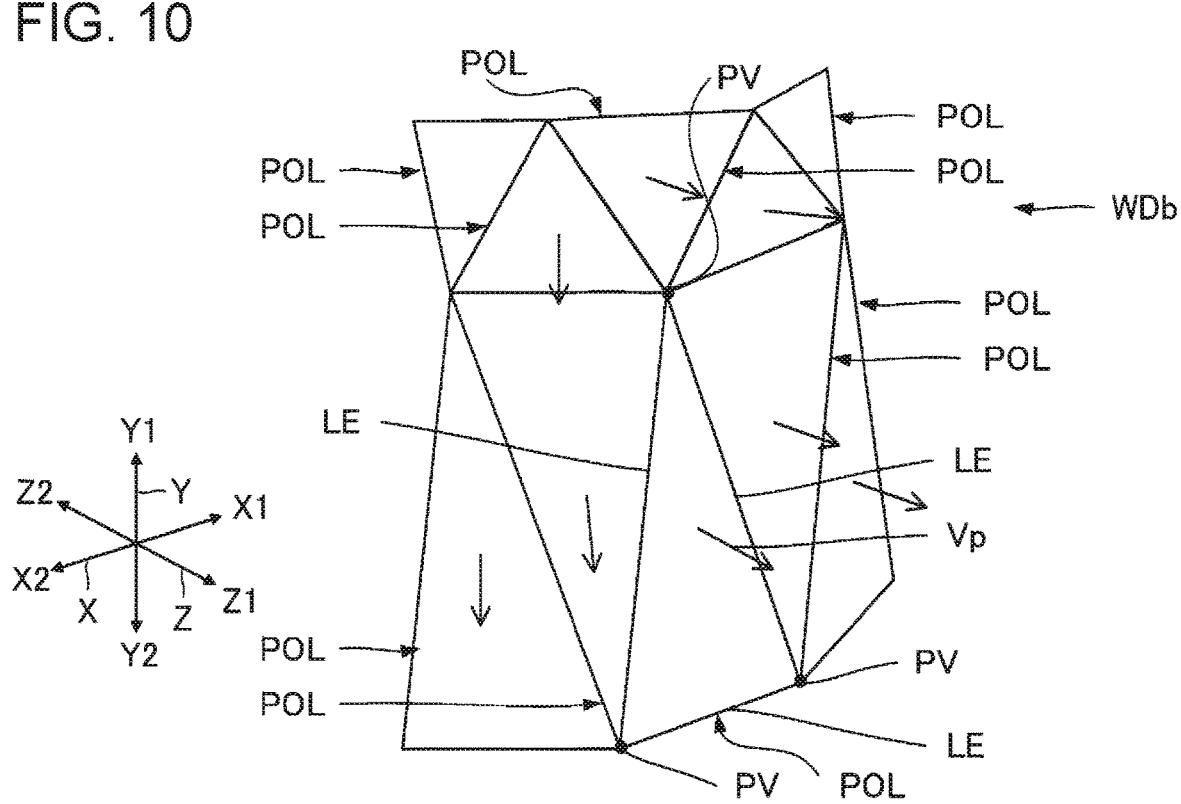
FIG. 10 is a diagram for explaining the acquisition of three-dimensional data in a first step.

FIG. 10 is a diagram for explaining the acquisition of the three-dimensional data Db in the first step S10. In the first step S10, the three-dimensional data Db is acquired. In FIG. 10, a part of a face WDb represented by the three-dimensional data Db is illustrated in a representative manner. The face WDb corresponds to the face WF of the workpiece W. In the example illustrated in FIG. 10, for easier understanding, the face WDb is shown in the base coordinate system or the robot coordinate system. The face WDb may be expressed in the workpiece coordinate system.

The face WDb is comprised of a plurality of polygons POL. In the example illustrated in FIG. 10, each of the polygons POL is a triangle with three edges LE and three vertices PV. Each of the edges LE is shared by two polygons POL. Two polygons POL sharing one edge LE are adjacent to each other, with this one edge LE defined as the boundary therebetween. Each of the vertices PV is shared by three or more polygons POL. Three or more polygons POL sharing one vertex PV touch one another at this one vertex PV. In FIG. 10, to facilitate the readers' understanding, the normal vector Vp of each polygon POL is illustrated. The normal vector Vp is expressed by the vector information Db2. The shape of each polygon POL is not limited to a triangle. Each polygon POL may have any other polygonal shape such as a quadrangle.

Figure 11:
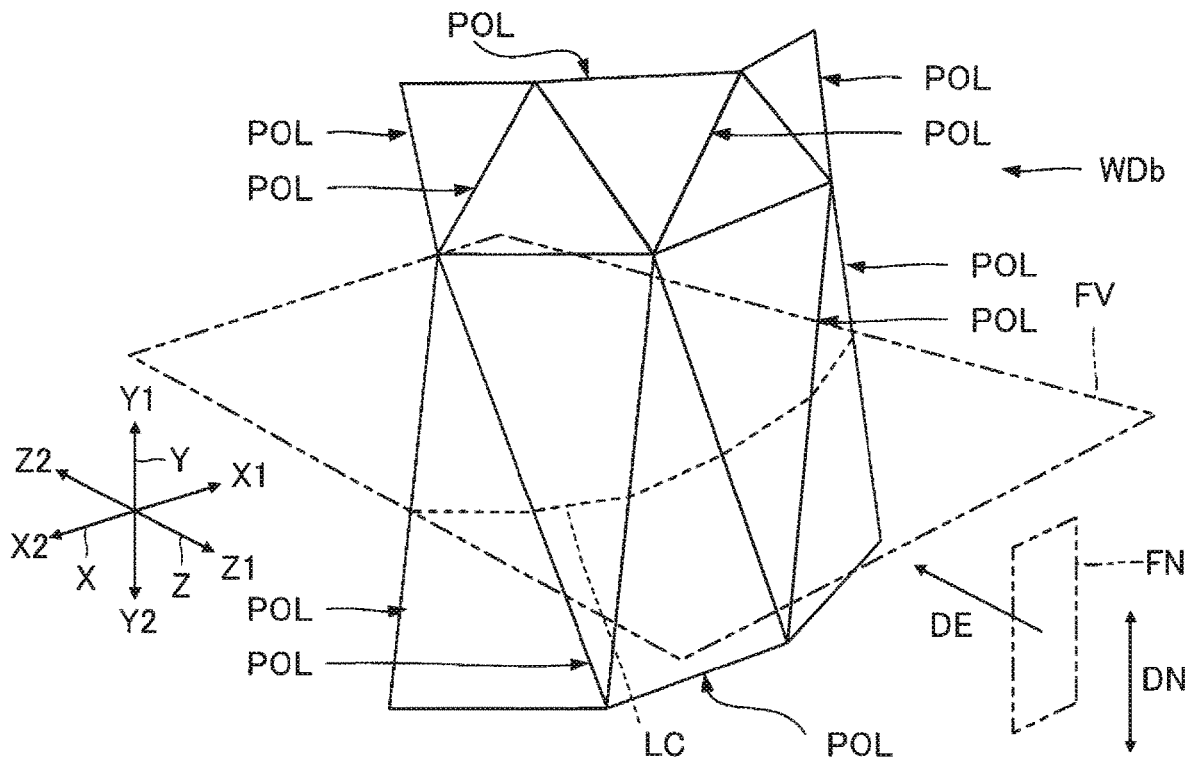
FIG. 11 is a diagram for explaining a virtual plane used for identifying passing polygons in a second step.

FIG. 11 is a diagram for explaining a virtual plane FV used for identifying the passing polygons POL_1 in the second step S20. The method for identifying the passing polygons POL_1 is not specifically limited, as long as it is possible to identify polygons POL corresponding to the region to be scanned by the head 3a as the passing polygons POL_1. In the present embodiment, the passing polygons POL_1 are identified using the virtual plane FV.

More specifically, in the second step S20, first, the virtual plane FV expressed in the same coordinate system as that of the three-dimensional data Db is designated. The virtual plane FV traverses the face WDb. The virtual plane FV and the face WDb intersect with each other at the line of intersection LC.

The designation of the virtual plane FV is executed by the computer 7, based on print position information set by the user. The print position information is information regarding either one or both of position and orientation on the surface of the workpiece W at the time of printing desired by the user. The print position information is set based on an input made by the user into the computer 7. For example, by inputting the print position information using an input device of the computer 7, the user sets or appropriately adjusts either one or both of position and orientation of an image printed by the three-dimensional object printing apparatus 1 on the surface of the workpiece W. More specifically, the user is able to input the print position information by setting the position in accordance with movement of a cursor by mouse operation, etc. or adjusting the orientation by mouse operation such as a so-called drag-and-drop action, etc. on an image corresponding to the workpiece W and displayed based on the three-dimensional data Db.

The computer 7 designates the virtual plane FV in accordance with the print position information. Preferably, the virtual plane FV may be designated such that it is parallel to lines normal to polygons POL with which it intersects (the passing polygons POL_1 described later) as much as possible. For example, when there are five polygons POL intersecting therewith as illustrated in FIG. 11, the virtual plane FV is designated such that a sum or an average, etc. of differences between 90° and angles formed by the respective polygons POL and the virtual plane FV is minimized.

The virtual plane FV is a plane representing an ideal direction of ejecting ink by the head 3a and an ideal direction of movement of the head 3a. That is, during the execution of printing, the head 3a ejects ink in a direction parallel to the virtual plane FV, and the head 3a moves in a direction parallel to the virtual plane FV. As described here, the virtual plane FV is a plane serving as a reference for specifying the position and orientation of the head 3a during printing.

In the present embodiment, as described earlier, while print operation is performed, the robot 2 causes the joints 230_2, 230_3, and 230_5 to operate in a state in which the rotation axis of each of them is parallel to the Y axis. For this reason, the virtual plane FV is designated such that it is orthogonal to all of the rotation axes O2, O3, and O5.

Figure 12:
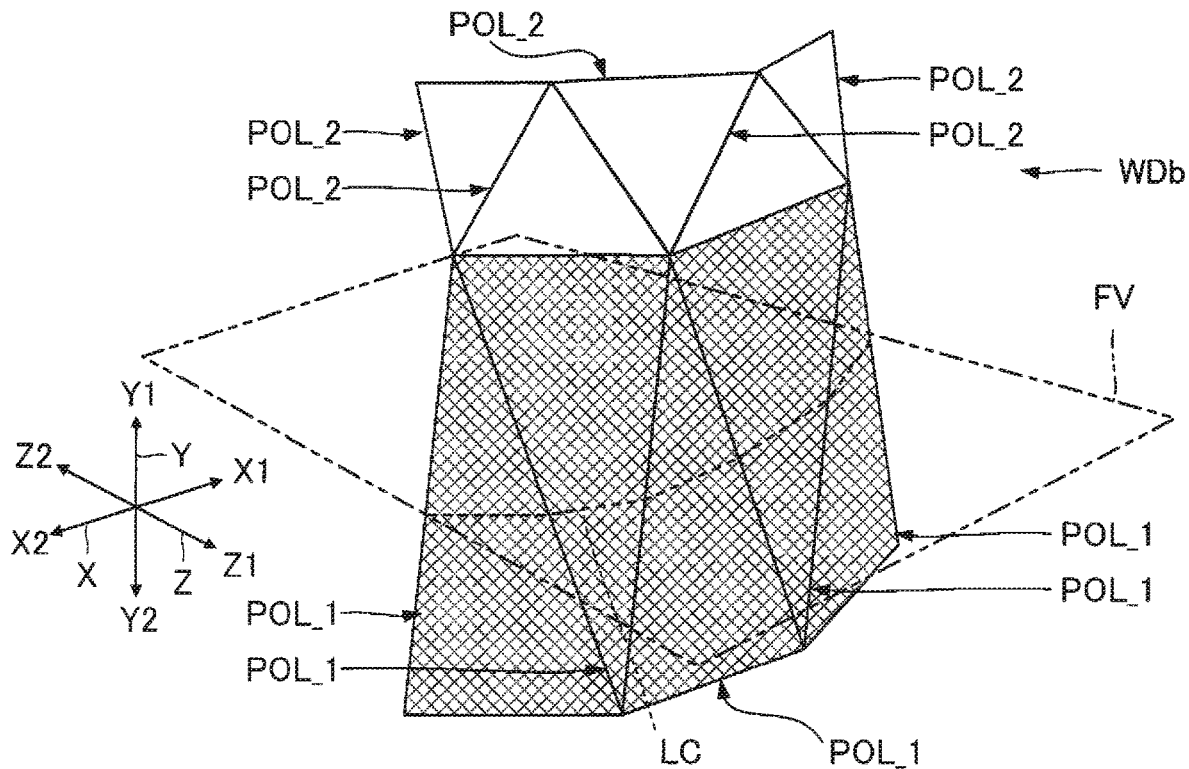
FIG. 12 is a diagram for explaining the identifying of the passing polygons in the second step.

FIG. 12 is a diagram for explaining the identifying of the passing polygons POL_1 in the second step S20. In the second step S20, after the designation of the virtual plane FV, the plurality of passing polygons POL_1, which are polygons POL intersecting with the virtual plane FV among the plurality of polygons POL, are identified. Since the virtual plane FV traverses the face WDb as described earlier, the plurality of polygons POL constituting the face WDb can be grouped into the plurality of passing polygons POL_1 intersecting with the virtual plane FV and a plurality of polygons POL_2 not intersecting with the virtual plane FV. In FIG. 12, to facilitate the readers' understanding, the passing polygons POL_1 are illustrated in a hatched manner.

Figure 13:
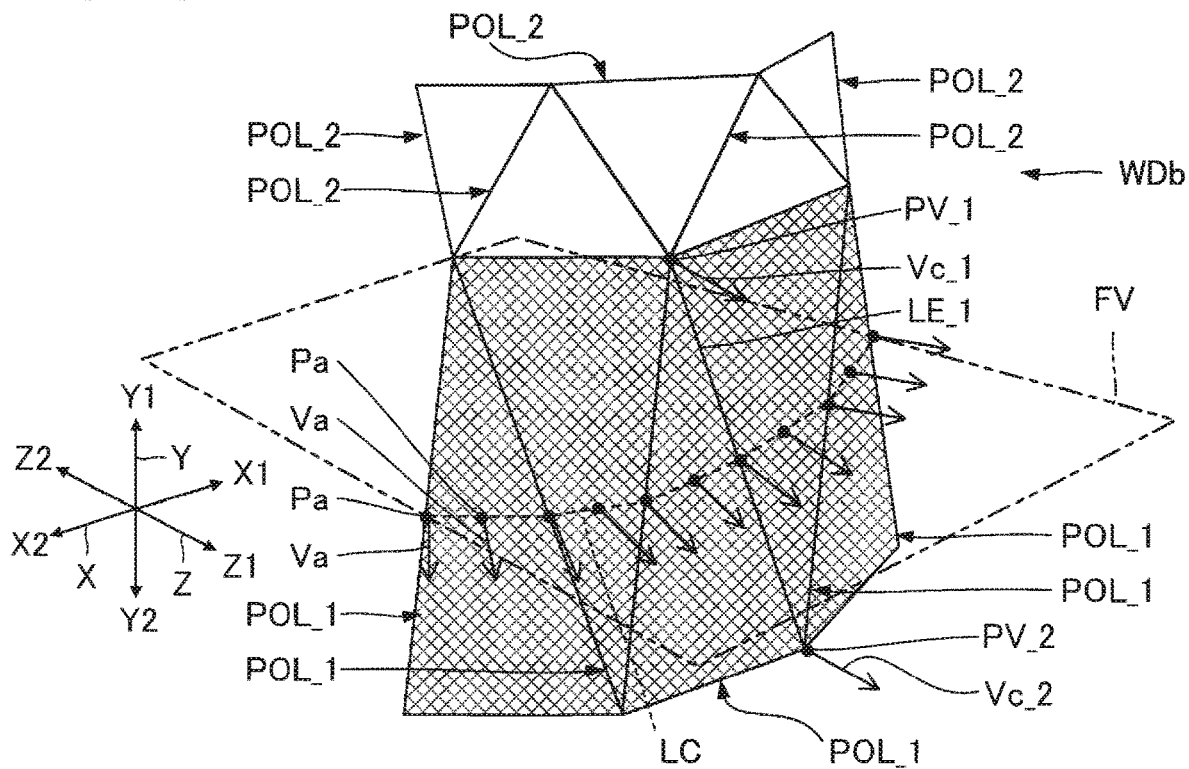
FIG. 13 is a diagram for explaining the setting of the position and orientation of a plurality of teaching points.

FIG. 13 is a diagram for explaining the setting of the position and orientation of a plurality of teaching points Pa. In the step S3, based on the plurality of passing polygons POL_1, a plurality of teaching points Pa is set. Specifically, in the step S3, respective intersections where the edges LE of the plurality of passing polygons POL_1 intersect with the virtual plane FV are used as teaching points Pa. Each teaching point Pa indicates the position and orientation of the head 3a.

In FIG. 13, orientation indicated by each teaching point Pa is expressed by means of a vector Va. The vector Va is a normal vector at the teaching point Pa and is identified based on the vector information Db2. For example, a vector Va indicating a direction along a normal line corresponding to an intersection mentioned above is specified based on a first vertex vector Vc_1 and a second vertex vector Vc_2. Among the edges LE of the plurality of passing polygons POL_1, the edge LE including the intersection is defined as a first edge LE_1. One end of the first edge LE_1 is defined as a first vertex PV_1. The other end of the first edge LE_1 is defined as a second vertex PV_2. Given these definitions, the first vertex vector Vc_1 is a normal vector corresponding to the first vertex PV_1, and the second vertex vector Vc_2 is a normal vector corresponding to the second vertex PV_2. It is preferable if these vertex vectors have been calculated in advance based on the vector information Db2 included in the three-dimensional data Db.

In the example illustrated in FIG. 13, besides the plurality of intersections, interpolation points obtained by interpolation between these intersections are used as teaching points Pa. Therefore, even if the number of the polygons POL expressing the shape of the workpiece W is small, it is possible to make the density of the teaching points Pa high. In the example illustrated in FIG. 13, there is only one interpolation point between each two intersections arranged next to each other. However, the number of the interpolation points arranged therebetween may be two or more. Though a case where interpolation is performed by adding interpolation points is disclosed as an example in the present embodiment, the method of interpolation is not limited thereto. The interpolation may be performed by adding interpolation curves or line segments. Depending on the number of the polygons POL expressing the shape of the workpiece W, the interpolation may be omitted. The interpolation may be performed after decimating a part of the plurality of intersections, if necessary.

It is preferable if the interpolation points are arranged on a smooth curve passing through the plurality of intersections. Such a curve is expressed by, for example, a spline function. That is, it is preferable if the interpolation points are arranged based on spline interpolation. In this case, it is preferable if the interpolation points are located on the virtual plane FV, though they might be deviated from the line of intersection LC. The interpolation points may be arranged based on linear interpolation. However, in order to make the path of movement of the head 3a by the robot 2 smooth and reduce vibrations caused by the operation of the robot 2, it is preferable if the interpolation points are arranged using a curved interpolation technique such as spline interpolation, etc.

As described earlier, the face WF of the workpiece W has the smooth regions RP1 and RP3 and the stepped region RP2. Therefore, the face WDb has regions corresponding to the smooth regions RP1 and RP3 and the stepped region RP2. Among the regions of the face WDb, at the regions corresponding to the smooth regions RP1 and RP3, a plurality of teaching points Pa is set using a plurality of intersections and a plurality of interpolation points as described earlier. By contrast, among the regions of the face WDb, at the region corresponding to the stepped region RP2, a plurality of teaching points Pa is set such that the movement path RU such as the one described earlier with reference to FIG. 8 will be obtained. A detailed explanation will be given below.

Figure 14:
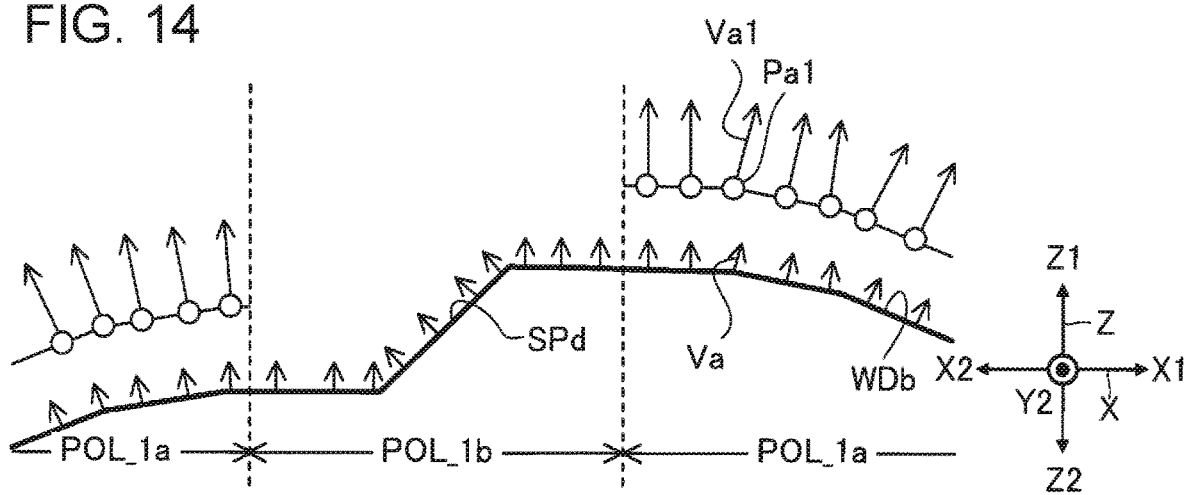
FIG. 14 is a diagram for explaining the setting of a plurality of smooth teaching points in a third step.

FIG. 14 is a diagram for explaining the setting of the plurality of smooth teaching points Pa1 in the third step S30. The face WDb has a step SPd corresponding to the step SP. The plurality of passing polygons POL_1 described earlier can be grouped into a plurality of smooth passing polygons POL_1a, which are the polygons POL corresponding to the smooth regions RP1 and RP3, and a plurality of stepped passing polygons POL_1b, which are the polygons POL corresponding to the stepped region RP2. The grouping can be performed numerically based on the vector information Db2 included in the three-dimensional data Db. The grouping may be performed by running a simulation to determine whether a collision occurs during the scanning of the head 3a over the face WF or not. The third step S30 includes a step of identifying the plurality of smooth passing polygons POL_1a among the plurality of passing polygons POL_1.

In the third step S30, based on the plurality of smooth passing polygons POL_1a, the position and orientation of the plurality of smooth teaching points Pa1 is set. Each of the plurality of smooth teaching points Pa1 is a teaching point Pa over the smooth region RP1 or the smooth region RP3. In FIG. 14, orientation indicated by each smooth teaching point Pa1 is expressed by means of a vector Va1.

The setting of the position and orientation of the smooth teaching points Pa1 is performed in the same manner as the setting of the position and orientation of the teaching points Pa, which is performed using a plurality of intersections and a plurality of interpolation points as described earlier. In the present embodiment, the tool center point TCP lies on the center of the ejection face FN as described earlier; therefore, each smooth teaching point Pa1 is located away from the face WDb in the Z1 direction as illustrated in FIG. 14. The smooth teaching points Pa1 are arranged such that the distance to the face WDb will be as constant as possible. The vector Va1 at each smooth teaching point Pa1 is set along the line normal to the face WDb at the corresponding position. The setting of the vector Va1 at each smooth teaching point Pa1 may be based on the vector Va.

Figure 15:
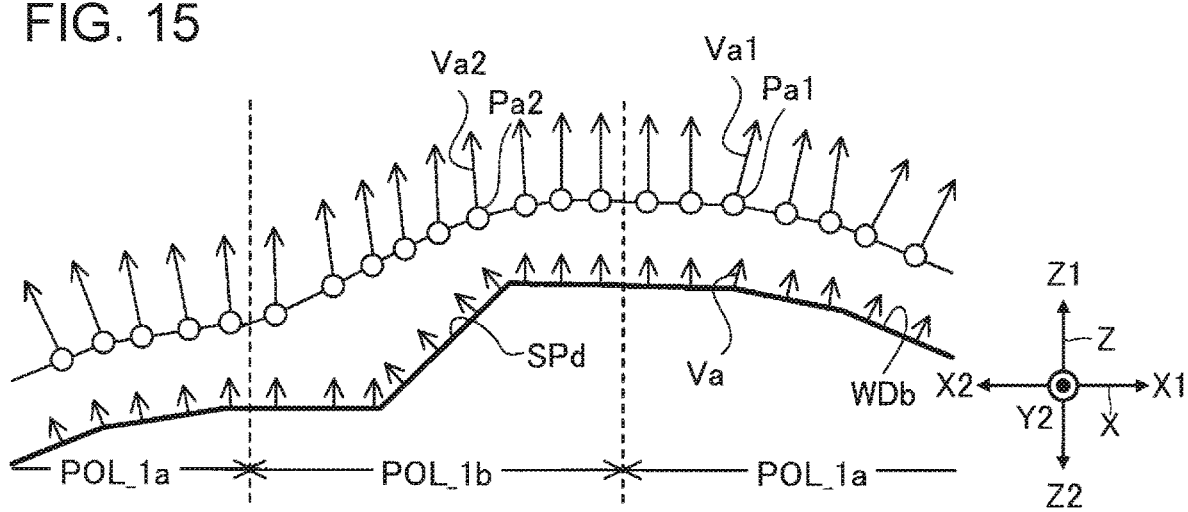
FIG. 15 is a diagram for explaining the setting of a plurality of stepped teaching points in a fourth step.

FIG. 15 is a diagram for explaining the setting of the plurality of stepped teaching points Pa2 in the fourth step S40. In the fourth step S40, based on the plurality of smooth passing polygons POL_1a or the plurality of smooth teaching points Pa1, the position and orientation of the plurality of stepped teaching points Pa2 is set. Each stepped teaching point Pa2 is a teaching point Pa over the stepped region RP2. In FIG. 15, orientation indicated by each stepped teaching point Pa2 is expressed by means of a vector Va2.

The setting of the position and orientation of the stepped teaching points Pa2 is performed based on the plurality of smooth passing polygons POL_1a or the plurality of smooth teaching points Pa1 such that a change in the position and orientation of the stepped teaching points Pa2 will be made as small as possible. More specifically, the position and orientation of the stepped teaching points Pa2 is set by performing interpolation between the smooth teaching points Pa1 corresponding to the smooth region RP1 and the smooth teaching points Pa1 corresponding to the smooth region RP3. For example, weighted averaging of the position and orientation indicated by the smooth teaching points Pa1 is used for the setting of the position and orientation indicated by the stepped teaching points Pa2.

The plurality of smooth teaching points Pa1 and the plurality of stepped teaching points Pa2 are set as explained above. In the fifth step S50, after the step S3, the print path information Da is generated based on the plurality of smooth teaching points Pa1 and the plurality of stepped teaching points Pa2. For example, the plurality of smooth teaching points Pa1 and the plurality of stepped teaching points Pa2 are set as the positions Pr described earlier with reference to FIG. 8. Moreover, as may be necessary, the direction of relative movement of the head 3a and the workpiece W along the positions represented by the print path information Da is designated. In the present embodiment, out of one direction along the line of intersection LC and the opposite direction thereof, the direction going away from the robot 2 is set as the movement direction.

As described earlier, the above method for teaching the robot 2 includes the first step S10, the second step S20, the third step S30, the fourth step S40, and the fifth step S50. Based on the print path information Da, the robot 2 changes the relative position and orientation of the head 3a, which ejects ink as an example of "liquid", and the workpiece W, which has a three-dimensional shape. The surface of the workpiece W has the smooth regions RP1 and RP3 and the stepped region RP2. The stepped region RP2 is adjacent to the smooth regions RP1 and RP3 and includes the step SP.

In the first step S10, the three-dimensional data Db, which is data representing the shape of the workpiece W using a plurality of polygons, is acquired. In the second step S20, among the plurality of polygons POL, the plurality of passing polygons POL_1, which are the polygons POL corresponding to the region to be scanned by the head 3a, is designated. In the third step S30, the position and orientation of the plurality of smooth teaching points Pa1, which are the teaching points Pa over the smooth regions RP1 and RP3, is set based on the plurality of smooth passing polygons POL_1a, which are the polygons POL corresponding to the smooth regions RP1 and RP3, among the plurality of passing polygons POL_1. In the fourth step S40, based on the plurality of smooth passing polygons POL_1a or the plurality of smooth teaching points Pa1, the position and orientation of the plurality of stepped teaching points Pa2, which are the teaching points Pa over the stepped region RP2, is set. In the fifth step S50, the print path information Da is generated based on the plurality of smooth teaching points Pa1 and the plurality of stepped teaching points Pa2.

The above method for teaching the robot 2 makes it possible to generate the print path information Da with a reduction in a sharp change in the position and orientation of the head 3a during the execution of print operation even if there exists the stepped region RP2 on the surface of the workpiece W. In this way, it is possible to cause the robot 2 to operate suitably in accordance with the shape of the workpiece W.

Especially in the fourth step S40, the position and orientation indicated by the plurality of stepped teaching points Pa2 is set without using the polygons corresponding to the stepped region RP2 among the plurality of passing polygons POL_1. Therefore, it is possible to effectively reduce a sharp change in the position and orientation of the head 3a during the execution of print operation using the print path information Da. In the fourth step S40, based on the plurality of smooth passing polygons POL_1a or the plurality of smooth teaching points Pa1, one of the position and orientation indicated by the plurality of stepped teaching points may be set. A more detailed explanation of this modification will be given in a second embodiment later.

As described earlier, in the three-dimensional object printing method, the head 3a and the robot 2 are used. The three-dimensional object printing method includes the first print operations MP1a and MP1b and the second print operation MP2.

In the first print operation MP1a, MP1b, ink is ejected from the head 3a onto the smooth region RP1, RP3 during a period of changing the relative position and orientation of the head 3a and the workpiece W. In the second print operation MP2 antecedent to or subsequent to the first print operation MP1b, MP1a in the same printing pass as that of the first print operation MP1a, MP1b, ink is ejected from the head 3a onto the stepped region RP2 during a period of changing the relative position and orientation of the head 3a and the workpiece W.

In addition, the amount of change in the angle of ejection θ during the execution of the second print operation MP2 is larger than the amount of change in the angle of ejection θ during the execution of the first print operation MP1a, MP1b. The angle of ejection θ mentioned herein is an angle formed by the first normal line LDE, which is a line normal to the ejection face FN, and the second normal line LN, which is a line normal to the surface of the workpiece W at the point of intersection with the first normal line LDE.

The three-dimensional object printing method described above makes it possible to suppress a sharp change in the orientation of the head 3a in relation to the workpiece W in the second print operation MP2 in comparison with a case where the amount of change in the angle of ejection θ during the execution of the second print operation MP2 is not larger than the amount of change in the angle of ejection θ during the execution of the first print operation MP1a, MP1b. Consequently, it is possible to prevent the collision of the head 3a with the workpiece W and reduce the vibrations of the robot 2. In this way, it is possible to cause the robot 2 to operate suitably in accordance with the shape of the workpiece W.

In addition, as described earlier, the amount of change in the distance of ejection LD during the execution of the second print operation MP2 is larger than the amount of change in the distance of ejection LD during the execution of the first print operation MP1a, MP1b. Therefore, in comparison with a case where the amount of change in the distance of ejection LD during the execution of the second print operation MP2 is not larger than the amount of change in the distance of ejection LD during the execution of the first print operation MP1a, MP1b, advantageously, it is easier to suppress a sharp change in the position of the head 3a in relation to the workpiece W in the second print operation MP2. The distance of ejection LD mentioned herein is the distance between the ejection face FN and the workpiece W in the direction along the first normal line LDE.

Moreover, as described earlier, the length of the trajectory of the head 3a during the execution of the second print operation MP2 is less than the length of the region where printing is performed on the surface of the workpiece W during the execution of the second print operation MP2. Therefore, in comparison with a case where the length of the trajectory of the head 3a during the execution of the second print operation MP2 is equal to the length of the region where printing is performed on the surface of the workpiece W during the execution of the second print operation MP2, a higher printing speed is achieved.

As described earlier, it is preferable if the relative moving speed of the ejection face FN and the surface of the workpiece W during the execution of the second print operation MP2 is not higher than the relative moving speed of the ejection face FN and the surface of the workpiece W during the execution of the first print operation MP1a, MP1b. As compared with a case where the relative moving speed of the ejection face FN and the surface of the workpiece W during the execution of the second print operation MP2 is higher than the relative moving speed of the ejection face FN and the surface of the workpiece W during the execution of the first print operation MP1a, MP1b, it is possible to suppress a decrease in print quality In this case. The relative moving speed of the ejection face FN and the surface of the workpiece W during the execution of the second print operation MP2 may be higher than the relative moving speed of the ejection face FN and the surface of the workpiece W during the execution of the first print operation MP1a, MP1b.

2. Second Embodiment

A second embodiment of the present disclosure will now be explained. In the exemplary embodiment described below, the same reference numerals as those used in the description of the first embodiment are assigned to elements that are the same in operation and/or function as those in the first embodiment, and a detailed explanation of them is omitted.

Figure 16:
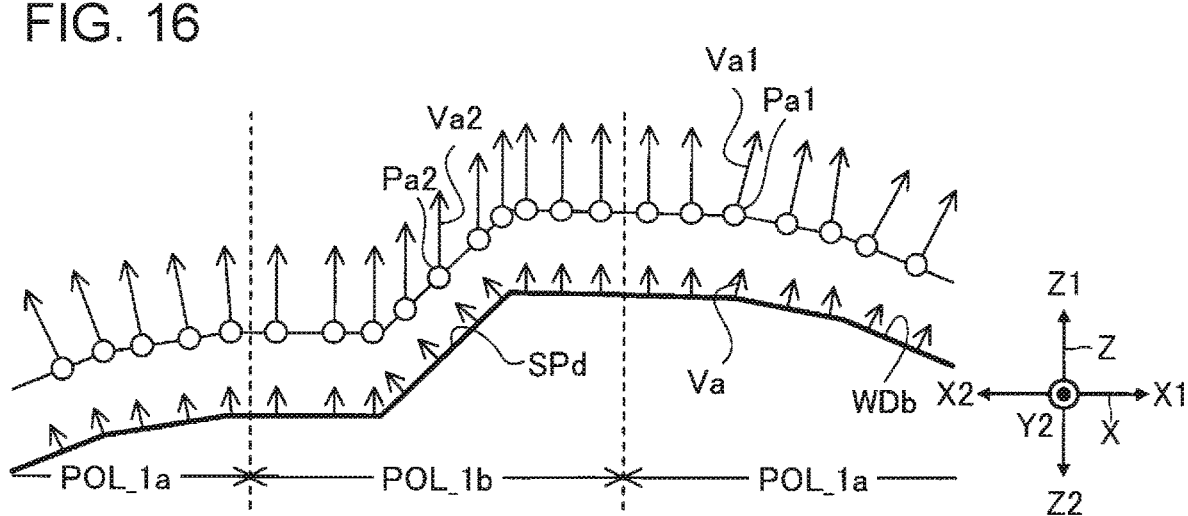
FIG. 16 is a diagram for explaining the setting of the plurality of stepped teaching points in the fourth step according to a second embodiment.

FIG. 16 is a diagram for explaining the setting of the plurality of stepped teaching points Pa2 in the fourth step S40 according to a second embodiment. The present embodiment is the same as the first embodiment described earlier except for a difference in the setting of the position of the plurality of stepped teaching points Pa2 in the fourth step S40.

In the fourth step S40 according to the present embodiment, the orientation of the plurality of stepped teaching points Pa2 is set based on the plurality of smooth passing polygons POL_1a or the plurality of smooth teaching points Pa1 as done in the first embodiment described earlier.

In addition, in the fourth step S40, the position of the plurality of stepped teaching points Pa2 is set based on the plurality of stepped passing polygons POL_1b. This setting is performed in the same manner as the setting of the position of the smooth teaching points Pa1 except that the stepped passing polygons POL_1b are used instead of the smooth passing polygons POL_1a. Therefore, the stepped teaching points Pa2 are arranged such that the distance to the face WDb will be as constant as possible.

The second embodiment described above also makes it possible to cause the robot 2 to operate suitably in accordance with the shape of the workpiece W. In the present embodiment, as already described, the orientation indicated by the plurality of stepped teaching points Pa2 is set based on the plurality of smooth passing polygons POL_1a or the plurality of smooth teaching points Pa1, and the position indicated by the plurality of stepped teaching points Pa2 is set based on the polygons corresponding to the stepped region RP2 among the plurality of passing polygons POL_1. Therefore, as compared with the first embodiment, it is possible to make the amount of computation required for setting the position and orientation of the stepped teaching points Pa2 smaller. Moreover, since it is possible to keep the distance between the face WF and the head 3a while preventing a sharp change in the orientation of the head 3a, enhanced quality of an image formed at the stepped region RP2 can be obtained.

3. Modification Examples

The embodiments described as examples above can be modified in various ways. Some specific examples of modification that can be applied to the embodiments described above are described below. Any two or more modification examples selected from the description below may be combined as long as they are not contradictory to each other or one another.

3-1. First Modification Example

In the foregoing embodiments, a configuration using a six-axis vertical multi-articulated robot as a robot has been described so as to show examples. However, the scope of the present disclosure is not limited thereto. The robot may be, for example, a vertical multi-articulated robot other than six-axis one, or may be a horizontal multi-articulated robot. The arm portion of the robot may have an expanding/contracting mechanism or a linear-motion mechanism, etc. in addition to a joint(s) configured as a rotating mechanism. However, to strike a good balance between print quality in print operation and freedom in operation of the robot during non-printing, it is preferable if the robot is a multi-articulated robot having six axes or more.

3-2. Second Modification Example

In the foregoing embodiments, the head is fastened to the robot with screws, etc. However, the scope of the present disclosure is not limited thereto. For example, the head may be fixed to the robot by gripping the head using a gripping mechanism such as a hand mounted as an end effector on the robot.

3-3. Third Modification Example

In the foregoing embodiments, a robot configured to move a head has been described so as to show examples. However, the scope of the present disclosure is not limited thereto. For example, the position of a liquid ejecting head may be fixed, and a robot may move a workpiece and thus may change the position and orientation of the workpiece in relation to the head three-dimensionally. In this case, the workpiece is gripped by a gripping mechanism such as, for example, a hand mounted on the distal end of a robot arm.

3-4. Fourth Modification Example

In the foregoing embodiments, a configuration using a single kind of ink to perform printing has been described so as to show examples. However, the scope of the present disclosure is not limited thereto. The present disclosure may be applied to a configuration using two or more kinds of ink to perform printing.

3-5. Fifth Modification Example

The scope of application of a three-dimensional object printing apparatus according to the present disclosure is not limited to printing. For example, a three-dimensional object printing apparatus that ejects a colorant solution can be used as an apparatus for manufacturing a color filter of a liquid crystal display device. A three-dimensional object printing apparatus that ejects a solution of a conductive material can be used as a manufacturing apparatus for forming wiring lines and electrodes of a wiring substrate. The three-dimensional object printing apparatus may be used as a jet dispenser for applying liquid such as an adhesive to a medium.

What is claimed is:

1. A three-dimensional object printing method using a head and a robot, the head having an ejection face in which a plurality of nozzles for ejecting liquid is provided, the robot changing relative position and orientation of the head in relation to a three-dimensional workpiece, a surface of the workpiece having a smooth region and a stepped region, the stepped region being adjacent to the smooth region and including a step, the three-dimensional object printing method comprising:
    first print operation of ejecting liquid from the head onto the smooth region during a period of changing the relative position and orientation of the head and the workpiece; and
    second print operation, antecedent to or subsequent to the first print operation, of ejecting liquid from the head onto the stepped region during a period of changing the relative position and orientation of the head and the workpiece,
    wherein
    an amount of change in an angle of ejection during execution of the second print operation is larger than an amount of change in the angle of ejection during execution of the first print operation,
    where,
    the angle of ejection is an angle formed by a first normal line and a second normal line,
    the first normal line is a line normal to the ejection face, and
    the second normal line is a line normal to the surface of the workpiece at a point of intersection with the first normal line.

2. The three-dimensional object printing method according to claim 1, wherein
    an amount of change in a distance of ejection during the execution of the second print operation is larger than an amount of change in the distance of ejection during the execution of the first print operation,
    where,
    the distance of ejection is a distance between the ejection face and the workpiece in a direction along the first normal line.

3. The three-dimensional object printing method according to claim 1, wherein
    a length of a trajectory of the head during the execution of the second print operation is less than a length of a region where printing is performed on the surface of the workpiece during the execution of the second print operation.

4. The three-dimensional object printing method according to claim 1, wherein
    a relative moving speed of the ejection face and the surface of the workpiece during the execution of the second print operation is not higher than a relative moving speed of the ejection face and the surface of the workpiece during the execution of the first print operation.

* * * * *